US012637359B2

(12) United States Patent
Tsunematsu et al.

(10) Patent No.: US 12,637,359 B2
(45) Date of Patent: *May 26, 2026

(54) SURFACE-TREATED INFRARED-ABSORBING FINE PARTICLES, SURFACE-TREATED INFRARED-ABSORBING FINE PARTICLE POWDER, INFRARED-ABSORBING FINE PARTICLE DISPERSION LIQUID IN WHICH THE SURFACE-TREATED INFRARED-ABSORBING FINE PARTICLES ARE USED, INFRARED-ABSORBING FINE PARTICLE DISPERSION, AND INFRARED-ABSORBING SUBSTRATE

(71) Applicant: SUMITOMO METAL MINING CO., LTD., Tokyo (JP)

(72) Inventors: Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 548 days.

This patent is subject to a terminal disclaimer.

(21) Appl. No.: 17/424,698

(22) PCT Filed: Dec. 12, 2019

(86) PCT No.: PCT/JP2019/048759
§ 371 (c)(1),
(2) Date: Sep. 23, 2021

(87) PCT Pub. No.: WO2020/153035
PCT Pub. Date: Jul. 30, 2020

(65) Prior Publication Data
US 2022/0081318 A1 Mar. 17, 2022

(30) Foreign Application Priority Data
Jan. 21, 2019 (JP) ................................. 2019-007725

(51) Int. Cl.
$C01G\ 41/02$ (2006.01)
$C03C\ 17/00$ (2006.01)
(Continued)

(52) U.S. Cl.
CPC ............ $C01G\ 41/02$ (2013.01); $C03C\ 17/009$ (2013.01); $C03C\ 17/23$ (2013.01); $G02B\ 1/12$ (2013.01);
(Continued)

(58) Field of Classification Search
CPC ..... $C01G\ 41/02$; $C03C\ 17/009$; $C03C\ 17/123$; $C03C\ 2217/48$
See application file for complete search history.

(56) References Cited

U.S. PATENT DOCUMENTS 6,416,890 B1 7/2002 Terneu et al.
10,533,100 B2 * 1/2020 Nakayama ............... C09K 3/00
(Continued)

FOREIGN PATENT DOCUMENTS

JP H08-12378 A 1/1996
JP H08-59300 A 3/1996
(Continued)

OTHER PUBLICATIONS

Jun. 16, 2021 International Preliminary Report on Patentability issued in International Patent Application No. PCT/JP2019/048759.
(Continued)

*Primary Examiner* — Jun Li
(74) *Attorney, Agent, or Firm* — Oliff PLC

(57) ABSTRACT

Provided are surface-treated infrared-absorbing fine particles that are infrared-absorbing fine particles each having a crystallite size greater than or equal to 30 nm and a surface that is coated with a coating layer that contains at least one selected from a hydrolysis product of a metal chelate compound, a polymer of the hydrolysis product of the metal
(Continued)

chelate compound, a hydrolysis product of a metal cyclic oligomer compound, and a polymer of the hydrolysis product of the metal cyclic oligomer compound.

16 Claims, 1 Drawing Sheet

(51) Int. Cl.

| | | |
|---|---|---|
| *C03C 17/23* | (2006.01) | |
| *G02B 1/12* | (2006.01) | |
| *B82Y 20/00* | (2011.01) | |
| *B82Y 35/00* | (2011.01) | |
| *B82Y 40/00* | (2011.01) | |

(52) U.S. Cl.
    CPC .............. *B82Y 20/00* (2013.01); *B82Y 35/00* (2013.01); *B82Y 40/00* (2013.01); *C01P 2004/64* (2013.01); *C01P 2006/60* (2013.01); *C03C 2217/452* (2013.01); *C03C 2217/48* (2013.01)

(56)                References Cited

U.S. PATENT DOCUMENTS

| | | | | |
|---|---|---|---|---|
| 11,208,563 | B2 * | 12/2021 | Tsunematsu | .............. C09C 1/00 |
| 11,787,949 | B2 * | 10/2023 | Tsunematsu | ........... C01G 41/02 |
| | | | | 106/31.65 |
| 2006/0178254 | A1 | 8/2006 | Takeda et al. | |
| 2010/0210772 | A1 * | 8/2010 | Hiwatashi | ................ G02B 5/22 |
| | | | | 524/406 |
| 2011/0297899 | A1 * | 12/2011 | Tofuku | |
| 2016/0028031 | A1 * | 1/2016 | Nakayama | ............. H10K 71/40 |
| | | | | 264/134 |
| 2018/0370813 | A1 * | 12/2018 | Tsunematsu | .............. C08K 3/22 |
| 2019/0002708 | A1 * | 1/2019 | Tsunematsu | .............. C09K 3/00 |
| 2019/0077676 | A1 * | 3/2019 | Nakayama | .......... C01G 41/006 |
| 2019/0085181 | A1 | 3/2019 | Nakayama et al. | |
| 2021/0047518 | A1 * | 2/2021 | Tsunematsu | ............. G02B 5/24 |

FOREIGN PATENT DOCUMENTS

| | | | | | |
|---|---|---|---|---|---|
| JP | H08-73223 | A | 3/1996 | | |
| JP | H08-283044 | A | 10/1996 | | |
| JP | H09-109849 | A | 4/1997 | | |
| JP | H09-127559 | A | 5/1997 | | |
| JP | H09-169849 | A | 6/1997 | | |
| JP | 2000-119045 | A | 4/2000 | | |
| JP | 2000-212480 | A | 8/2000 | | |
| JP | 2003-121884 | A | 4/2003 | | |
| JP | 2008239461 | A | * 10/2008 | ............. | B82Y 30/00 |
| JP | 2008-291109 | A | 12/2008 | | |
| JP | 2018-145003 | A | 9/2018 | | |
| WO | 2005/037932 | A1 | 4/2005 | | |
| WO | 2010/055570 | A1 | 5/2010 | | |
| WO | WO-2017104854 | A1 | * 6/2017 | ....... | B32B 17/10403 |
| WO | 2017/159790 | A1 | 9/2017 | | |

OTHER PUBLICATIONS

Feb. 18, 2020 International Search Report issued in International Patent Application No. PCT/JP2019/048759.

Oct. 5, 2022 Extended Search Report issued in European Patent Application No. 19911095.8.

* cited by examiner

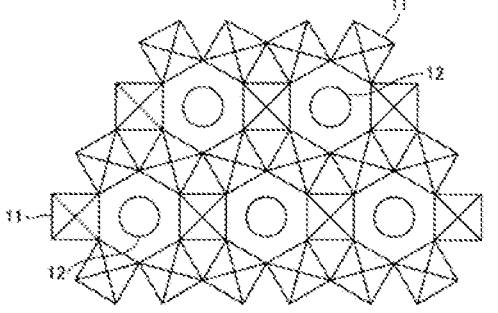

SURFACE-TREATED INFRARED-ABSORBING FINE PARTICLES, SURFACE-TREATED INFRARED-ABSORBING FINE PARTICLE POWDER, INFRARED-ABSORBING FINE PARTICLE DISPERSION LIQUID IN WHICH THE SURFACE-TREATED INFRARED-ABSORBING FINE PARTICLES ARE USED, INFRARED-ABSORBING FINE PARTICLE DISPERSION, AND INFRARED-ABSORBING SUBSTRATE

TECHNICAL FIELD

The present invention relates to surface-treated infrared-absorbing fine particles that are obtained by coating, with a predetermined coating layer, surfaces of infrared-absorbing fine particles that transmit light in the visible light region and absorb light in the infrared region, a surface-treated infrared-absorbing fine particle powder that contains the surface-treated infrared-absorbing fine particles, an infrared-absorbing fine particle dispersion liquid in which the surface-treated infrared-absorbing fine particles are used, an infrared-absorbing fine particle dispersion, an infrared-absorbing substrate, and methods for producing the same.

BACKGROUND ART

In recent years, demand for infrared absorbers has increased rapidly, and many patents have been proposed for the infrared absorbers. These proposals will be viewed from a functional perspective. For example, in the field of window materials for various buildings and vehicles, there are infrared absorbers for the purpose of shielding near-infrared light while sufficiently taking in visible light, to suppress a rise in indoor temperature while maintaining brightness, and for the purpose of preventing malfunctions in cordless phones and remote controls of home appliances caused by infrared light emitted forward from a PDP (Plasma Display Panel) thereby adversely affecting transmission optical communications, and the like.

Further, these proposals will be viewed from a perspective of light-shielding members. For example, a light-shielding film that contains a black pigment including inorganic pigments such as carbon black and titanium black, which have absorption properties in the range from the visible light region to the near-infrared region, and organic pigments such as aniline black, which has strong absorption properties only in the visible light region, and a half-mirror-type light shielding member on which a metal such as aluminum is deposited, are proposed as light shielding members used for window materials, etc.

For example, Patent Document 1 discloses an infrared-shielding glass that can be suitably used for parts for which high visible light transmittance and good infrared-shielding performance are required. The infrared-shielding glass is obtained by providing a composite tungsten oxide film containing at least one metal ion selected from the group consisting of Group Ma, Group IVa, Group Vb, Group VIb, and Group VIIb of the periodic table as a first layer on a transparent glass substrate, providing a transparent dielectric film as a second layer on the first layer, providing a composite tungsten oxide film containing at least one metal ion selected from the group consisting of Group Ma, Group IVa, Group Vb, Group VIb, and Group VIIb of the periodic table as a third layer on the second layer, and making the refractive index of the transparent dielectric film of the second layer lower than that of the composite tungsten oxide films of the first layer and the third layer.

Further, Patent Document 2 discloses an infrared-shielding glass in which a first dielectric film is provided as a first layer on a transparent glass substrate, a tungsten oxide film is provided as a second layer on the first layer, and a second dielectric film is provided as a third layer on the second layer in the same manner as in Patent Document 1.

Further, Patent Document 3 discloses a heat ray shielding glass in which a composite tungsten oxide film containing the same metal element as in Patent Document 1 is provided as a first layer on a transparent substrate, and a transparent dielectric film is provided as a second layer on the first layer in the same manner as in Patent Document 1.

Further, Patent Document 4 discloses a sunlight control glass sheet that has sunlight shielding properties and in which a metal oxide film is formed using a CVD method or a spray method and thereafter subjected to thermal decomposition at about 250° C., the metal oxide film containing an additional element such as hydrogen, lithium, sodium, or potassium, and being selected from at least one of tungsten trioxide ($WO_3$), molybdenum trioxide ($MoO_3$), niobium pentoxide ($Nb_2O_5$), tantalum pentoxide ($Ta_2O_5$), vanadium pentoxide ($V_2O_5$), and vanadium dioxide ($VO_2$).

Further, Patent Document 5 discloses a sunlight controllable heat insulation material in which tungsten oxide obtained by hydrolyzing tungstic acid is used and an organic polymer called polyvinylpyrrolidone, which has a specific structure, is added to the tungsten oxide. When the sunlight controllable heat insulation material is irradiated with sunlight, the tungsten oxide absorbs ultraviolet rays in the light to generate excited electrons and holes, an appearance amount of pentavalent tungsten is significantly increased and a coloring reaction is accelerated by a small amount of ultraviolet rays, and accordingly, a coloring concentration is increased. On the other hand, when the light is shielded, the pentavalent tungsten is very quickly oxidized to hexavalent tungsten and a decoloring reaction is accelerated. Patent Document 5 discloses that, by using the coloring/decoloring properties, a sunlight controllable heat insulation material is obtained in which coloring and decoloring reactions with respect to sunlight are fast, an absorption peak appears at the wavelength of 1250 nm in the near-infrared region at the time of coloring, and that can shield near-infrared rays of sunlight.

On the other hand, in Patent Document 6, the inventors of the present invention disclosed obtaining tungsten oxide fine particle powder constituted by tungsten trioxide, a hydrate thereof, or a mixture of both by dissolving tungsten hexachloride in alcohol, evaporating the medium as is, or evaporating the medium after heating the medium to reflux, and thereafter applying heat at 100° C. to 500° C. The inventors disclosed that an electrochromic device can be obtained using the tungsten oxide fine particles, and when a multi-layered laminate is formed and protons are introduced into the layer, optical properties of the layer can be changed.

Further, Patent Document 7 proposes methods for producing various types of tungsten bronze represented by $MxWO_3$ (M; metal element such as alkali metal, alkaline earth metal, or rare earth metal, satisfying $0<x<1$) by using a meta-type ammonium tungstate and various water-soluble metal salts as raw materials, heating a dried product of an aqueous solution of a mixture of the raw materials at a heating temperature of about 300° C. to 700° C., and supplying hydrogen gas to which inert gas (addition amount: about 50 vol % or more) or steam (addition amount: about 15 vol % or less) is added for this heating. Patent Document 7 also proposes methods for producing various tungsten bronze coated composites by performing a similar procedure on a supporting body, to use the composites as electrode catalyst materials for fuel cells or the like.

Further, in Patent Document 8, the inventors of the present invention disclosed an infrared-shielding material fine particle dispersion that is obtained by dispersing infrared-shielding material fine particles in a medium, excellent optical properties and electric conductivity, and a method for producing the infrared-shielding material fine particle dispersion. In particular, infrared shielding properties were superior to those of conventional shielding materials. The infrared-shielding material fine particles are fine particles of tungsten oxide represented by a general formula WyOz (where W is tungsten, O is oxygen, satisfying $2.2 \leq z/y \leq 2.999$) and/or fine particles of composite tungsten oxide represented by a general formula MxWyOz (where M is at least one element selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$ and $2.2 \leq z/y \leq 3.0$), and a particle size of the infrared-shielding material fine particles is 1 nm or more and 800 nm or less.

CITATION LIST

Patent Documents

Patent Document 1: JP H8-59300A
Patent Document 2: JP H8-12378A
Patent Document 3: JP 118-283044A
Patent Document 4: JP 2000-119045A
Patent Document 5: JP 119-127559A
Patent Document 6: JP 2003-121884A
Patent Document 7: JP 118-73223A
Patent Document 8: WO 2005/37932
Patent Document 9: WO 2010/55570

SUMMARY OF INVENTION

Technical Problem

According to studies carried out by the inventors of the present invention, it was found that, in an optical member (film, resin sheet, etc.) containing fine particles of the tungsten oxide and/or fine particles of the composite tungsten oxide, water vapor in the air and water gradually penetrate into a solid-state resin contained in the optical member, depending on conditions and the method in which the optical member is used. It was also found that when water vapor and water gradually penetrate into the solid-state resin, there is a problem in that surfaces of the tungsten oxide fine particles are decomposed, a transmittance of light having a wavelength of 200 to 2600 nm increases with time, and an infrared absorption performance of the optical member gradually decreases. The "solid-state resin" is a polymer medium that is solid at room temperature, and includes a polymer medium other than those three-dimensionally crosslinked (in the present invention, a solid-state resin may also be referred to as a "matrix resin").

Also, according to the studies carried out by the inventors of the present invention, it was found that surfaces of the tungsten oxide fine particles and the composite tungsten oxide fine particles disclosed in Patent Document 8 are oxidized and degraded when exposed to heat, resulting in loss of an infrared absorption effect. It was also found that active harmful radicals are generated in the polymer medium such as the solid-state resin through exposure to heat, and the surfaces of the fine particles are also decomposed and degraded by the harmful radicals, resulting in loss of the infrared absorption effect.

Under the above-described circumstances, in Patent Document 9, the inventors of the present invention disclosed, as infrared-shielding fine particles that have excellent water resistance and excellent infrared shielding properties, fine particles of tungsten oxide represented by a general formula WyOz and/or composite tungsten oxide represented by a general formula MxWyOz, which have an average primary particle size of 1 nm or more and 800 nm or less, and of which surfaces are coated with a tetrafunctional silane compound or a partial hydrolysis product thereof, and/or an organometallic compound, and a method for producing the infrared-shielding fine particles.

However, infrared-absorbing materials are fundamentally used outdoors because of their characteristics, and are often required to have high weather resistance. As demands in the market are increasing year by year, further improvement in water resistance and moist heat resistance is required for the infrared-shielding fine particles disclosed in Patent Document 9. Also, the infrared-shielding fine particles disclosed in Patent Document 9 still have a problem in that an effect of improving the resistance to heat exposure, i.e., heat resistance is insufficient.

Furthermore, infrared-shielding fine particles are often used for an infrared-shielding fine particle dispersion having high visible light transmittance for which a high degree of visibility is required, utilizing their optical characteristics of selectively shielding infrared rays. Consequently, infrared-absorbing materials such as the infrared-shielding fine particle dispersion are required to have a low haze value (also referred to as a "low haze" in the present invention).

The present invention was made under the above-described circumstances, and has an object of providing surface-treated infrared-absorbing fine particles that have excellent moist heat resistance, excellent heat resistance, and excellent infrared absorbing properties, a surface-treated infrared-absorbing fine particle powder that contains the surface-treated infrared-absorbing fine particles, and an infrared-absorbing fine particle dispersion liquid in which the surface-treated infrared-absorbing fine particles are used, and further providing an infrared-absorbing fine particle dispersion and an infrared-absorbing substrate that have excellent moist heat resistance, excellent heat resistance, excellent visible light transmittance, excellent infrared absorbing properties, and a low haze.

Solution to Problem

In order to solve the above-described problem, the inventors of the present invention carried out a study on a configuration that makes it possible to improve the moist heat resistance and chemical stability of infrared-absorbing fine particles, by using the tungsten oxide fine particles and/or the composite tungsten oxide fine particles described above, which have excellent optical properties, as the infrared-absorbing fine particles. As a result, the inventors arrived at the importance of coating surfaces of the individual infrared-absorbing fine particles with a compound that has an excellent affinity with the surfaces of the infrared-absorbing fine particles and is uniformly adsorbed on the surfaces of the individual infrared-absorbing fine particles to form a strong coating layer.

The inventors of the present invention further continued the study and arrived at metal chelate compounds and metal cyclic oligomer compounds as compounds that have an excellent affinity with the above-described infrared-absorbing fine particles and form the coating layer. As a result of a further study, the inventors arrived at hydrolysis products of the metal chelate compounds and the metal cyclic oligomer compounds, which are formed when these compounds are hydrolyzed, and polymers of the hydrolysis products, as compounds that are uniformly adsorbed on the surfaces of the individual infrared-absorbing fine particles and form the strong coating layer.

Namely, the inventors arrived at infrared-absorbing fine particles (which may be referred to as "surface-treated infrared-absorbing fine particles" in the present invention) that are tungsten oxide fine particles and/or composite tungsten oxide fine particles of which surfaces are coated with a coating layer that contains at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound. It was found that the surface-treated infrared-absorbing fine particles have excellent moist heat resistance.

Furthermore, it was found that the surface-treated infrared-absorbing fine particles, a surface-treated infrared-absorbing fine particle powder containing the surface-treated infrared-absorbing fine particles, an infrared-absorbing fine particle dispersion produced using an infrared-absorbing fine particle dispersion liquid obtained by dispersing the surface-treated infrared-absorbing fine particles in a suitable medium, and the like have excellent moist heat resistance and excellent infrared absorbing properties.

The inventors of the present invention further continued the study and found that, if the crystallite size of the infrared-absorbing fine particles is greater than or equal to a specific value, an infrared-absorbing fine particle dispersion liquid produced using the infrared-absorbing fine particles and an infrared-absorbing fine particle dispersion produced using the dispersion liquid have excellent heat resistance.

Naturally, a crystallite size greater than or equal to the specific value usually increases the haze value due to Rayleigh scattering, and there was concern that the visibility of the infrared-absorbing fine particle dispersion, which is characterized by its high visible light transmittance, would be reduced.

However, the inventors arrived at the present invention by solving the above-described problem based on a breakthrough finding that if the infrared-absorbing fine particles are surface-treated infrared-absorbing fine particles, the above does not apply and it is possible to produce an infrared-absorbing fine particle dispersion and an infrared-absorbing substrate that have a low haze.

Namely, in order to solve the above-described problem, a first invention provides surface-treated infrared-absorbing fine particles that are infrared-absorbing fine particles each having a crystallite size greater than or equal to 30 nm and a surface that is coated with a coating layer that contains at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound.

Advantageous Effects of Invention

By using the surface-treated infrared-absorbing fine particles according to the present invention, it is possible to produce an infrared-absorbing fine particle dispersion and an infrared-absorbing substrate that have high moist heat resistance, high heat resistance, high visible light transmittance, excellent infrared absorbing properties, and low haze.

BRIEF DESCRIPTION OF DRAWINGS

FIG. 1 is a schematic plan view of a crystal structure of a composite tungsten oxide having a hexagonal crystal structure.

DESCRIPTION OF EMBODIMENTS

Surface-treated infrared-absorbing fine particles according to the present invention are obtained by coating surfaces of tungsten oxide fine particles and/or composite tungsten oxide fine particles, which are infrared-absorbing fine particles, with a coating layer that contains at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound.

The following describes the present invention in detail in the following order: [1] Infrared-absorbing fine particles, [2] Surface treatment agent used to coat surfaces of the infrared-absorbing fine particles, [3] Method for coating surfaces of the infrared-absorbing fine particles, and [4] Infrared-absorbing fine particle dispersion and infrared-absorbing substrate obtained using surface-treated infrared-absorbing fine particles, and article.

In the present invention, a "coating layer that is formed on surfaces of infrared-absorbing fine particles to impart moist heat resistance to the fine particles by using at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound" may be simply referred to as a "coating layer".

[1] Infrared-Absorbing Fine Particles

It is known that a material containing free electrons commonly exhibits a reflection-absorption response to an electromagnetic wave around a solar ray region having a wavelength of 200 nm to 2600 nm due to plasma vibration. It is known that when powder particles of such a material are made into particles smaller than a wavelength of light, geometric scattering in the visible light region (wavelength 380 nm to 780 nm) is reduced, and transparency in the visible light region is obtained.

Note that in the present invention, the term "transparency" is used to mean "there is little scattering and high transmittance with respect to light in the visible light region".

Commonly, there are no effective free electrons in tungsten oxide ($WO_3$), and therefore $WO_3$ has little absorption and reflection properties in the infrared region, and is not effective as the material of infrared-absorbing fine particles.

On the other hand, it is known that $WO_3$ having oxygen deficiency and a composite tungsten oxide obtained by adding a positive element such as Na to $WO_3$ are electrically conductive materials and have free electrons. Analysis of a single crystal or the like of these materials having free electrons suggests a response of the free electrons to light in the infrared region.

The inventors of the present invention found that there is a particularly effective range as infrared-absorbing fine particles in a specific portion of a composition range of the tungsten and oxygen, and conceived of tungsten oxide fine particles and composite tungsten oxide fine particles that are transparent in the visible light region and have absorption properties in the infrared region.

Here, the tungsten oxide fine particles and/or the composite tungsten oxide fine particles, which are infrared-absorbing fine particles according to the present invention, will be described in the following order: (1) Tungsten oxide fine particles, (2) Composite tungsten oxide fine particles, (3) Tungsten oxide fine particles and composite tungsten oxide fine particles, and (4) Crystallite size of tungsten oxide fine particles and composite tungsten oxide fine particles.

(1) Tungsten Oxide Fine Particles

Tungsten oxide fine particles according to the present invention are fine particles of tungsten oxide represented by a general formula $WyOz$ (W is tungsten, O is oxygen, and satisfying $2.2 \leq z/y \leq 2.999$).

In the tungsten oxide represented by the general formula $WyOz$, the composition range of tungsten and oxygen is preferably such that the composition ratio of oxygen to tungsten is less than 3, and when the infrared-absorbing fine particles are described as $WyOz$, $2.2 \leq z/y \leq 2.999$ is satisfied.

When the value of $z/y$ is 2.2 or more, an appearance of a $WO_2$ crystal phase other than intended in the tungsten oxide can be avoided, and it is possible to obtain chemical stability as a material, and therefore the tungsten oxide fine particles are effective as infrared-absorbing fine particles. On the other hand, when the value of $z/y$ is 2.999 or less, a required amount of free electrons are generated, resulting in efficient infrared-absorbing fine particles.

(2) Composite Tungsten Oxide Fine Particles

When a composite tungsten oxide is obtained by adding an element M, which will be described later, to the $WO_3$ described above, free electrons are generated in the $WO_3$, strong absorption properties derived from the free electrons are exhibited particularly in the near-infrared region, and such composite tungsten oxide fine particles are effective as near-infrared absorbing fine particles for a region around 1000 nm.

That is, by performing both control of the oxygen amount and addition of the element M that generates free electrons, with respect to $WO_3$, more efficient infrared-absorbing fine particles can be obtained. When infrared-absorbing fine particles obtained by performing both control of the oxygen amount and addition of the element M that generates free electrons are represented by a general formula $MxWyOz$ (where M is the element M described above, W is tungsten, and O is oxygen), it is desirable to satisfy the following relationships: $0.001 \leq x/y \leq 1$ and $2.0 \leq z/y \leq 3$.

First, the value of $x/y$ indicating an addition amount of the element M will be described.

When the value of $x/y$ is larger than 0.001, a sufficient amount of free electrons are generated in the composite tungsten oxide, and a desired infrared absorption effect can be obtained. As the addition amount of the element M increases, a supply amount of free electrons increases and an infrared absorption efficiency also increases, but this effect is saturated when the value of $x/y$ is about 1. Further, the value of $x/y$ is preferably smaller than 1 to avoid the formation of an impurity phase in the infrared-absorbing fine particles.

The element M is preferably at least one element selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I.

Here, from the standpoint of stability of the $MxWyOz$ added with the element M, the element M is more preferably at least one element selected from alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re. From the standpoint of enhancing optical properties and weather resistance as infrared-absorbing fine particles, the element M further preferably belongs to any of alkaline earth metal elements, transition metal elements, 4B group elements, and 5B group elements.

Next, the value of $z/y$ indicating the control of the oxygen amount will be described. In the composite tungsten oxide represented by $MxWyOz$, the same mechanism as that of the above-described tungsten oxide represented by $WyOz$ works, and in addition, free electrons are supplied depending on the amount of the element M described above even when $z/y = 3.0$ or $2.0 \leq z/y \leq 2.2$. Therefore, the value of $z/y$ is preferably $2.0 \leq z/y \leq 3.0$, more preferably $2.2 \leq z/y \leq 3.0$, and further preferably $2.45 \leq z/y \leq 3.0$.

Further, when the composite tungsten oxide fine particles have a hexagonal crystal structure, the transmission of the fine particles in the visible light region is improved, and the absorption of the fine particles in the infrared region is improved. This will be described with reference to FIG. 1, which is a schematic plan view of the hexagonal crystal structure.

In FIG. 1, a hexagonal void is formed as a result of six octahedrons formed by units of $WO_6$ indicated by reference numeral 11 assembling, the element M indicated by reference numeral 12 is arranged in the void to constitute one unit, and a large number of these units gather to form a hexagonal crystal structure.

In order to obtain the effect of improving light transmission in the visible light region and improving light absorption in the infrared region, the composite tungsten oxide fine particles are only required to include the unit structure described using FIG. 1, and the composite tungsten oxide fine particles may be crystalline or amorphous.

When a positive ion of the element M is added and is present in the hexagonal void, light transmission in the visible light region and light absorption in the infrared region are improved. Commonly, the hexagonal crystal is easily formed when an element M that has a large ionic radius is added. Specifically, the hexagonal crystal is easily formed when any of Cs, K, Rb, Tl, In, Ba, Li, Ca, Sr, Fe, and Sn is added. As a matter of cause, the element M is not limited to these elements and an element other than these elements may be present as the above-described element M in the hexagonal void formed by units of $WO_6$.

When the composite tungsten oxide fine particles having the hexagonal crystal structure have a uniform crystal structure, the addition amount of the additional element M indicated by the value of $x/y$ is preferably 0.2 or more and 0.5 or less, and more preferably 0.33. It is thought that when the value of $x/y$ is 0.33, the above-described element M is arranged in all the hexagonal voids.

Further, tetragonal and cubic composite tungsten oxides are also effective as infrared-absorbing fine particles, other than hexagonal. An absorption position in the infrared region tends to change depending on the crystal structure, and the absorption position tends to shift to a longer wavelength side in the following order: cubic crystal<tetragonal crystal<hexagonal crystal. Further, accompanying such a tendency, hexagonal crystal, tetragonal crystal, and cubic crystal have less absorption in the visible light region in this order. Therefore, it is preferable to use a hexagonal composite tungsten oxide for applications that transmit more visible light and shield more infrared light. However, the present invention is not limited thereto and the tendency of the optical properties described here is only a rough tendency, and varies depending on the type of the additional element, the addition amount, and the oxygen amount.

(3) Tungsten Oxide Fine Particles and Composite Tungsten Oxide Fine Particles

Infrared-absorbing fine particles including the tungsten oxide fine particles and/or the composite tungsten oxide fine particles according to the present invention largely absorb light in the near-infrared region, particularly near the wavelength of 1000 nm, and therefore a transmission color tone thereof is often from blue to green.

The dispersed particle size of the tungsten oxide fine particles and/or the composite tungsten oxide fine particles in the infrared-absorbing fine particles can be selected depending on the objective of use.

When the infrared-absorbing fine particles are to be used in applications where transparency is desired to be maintained, the particles preferably have a particle size of 800 nm or less. This is because particles smaller than 800 nm do not completely shield light due to scattering, and maintain visibility in the visible light region, and at the same time, efficiently maintain transparency. Particularly, when importance is placed on transparency in the visible light region, it is preferable to further consider scattering by the particles.

When importance is placed on a reduction of scattering by the particles, the dispersed particle size is preferably 200 nm or less, and more preferably 100 nm or less. This is because when the dispersed particle size of the particles is small, scattering of light in the visible light region having a wavelength of 400 nm to 780 nm due to geometric scattering or Mie scattering is reduced, and as a result, it is possible to avoid a situation in which an infrared absorbing layer becomes like frosted glass and clear transparency cannot be obtained. Namely, when the dispersed particle size is 200 nm or less, the geometric scattering or Mie scattering is reduced, and a Rayleigh scattering region is formed. In the Rayleigh scattering region, the scattered light decreases in proportion to a sixth power of the particle size, and therefore scattering is reduced and transparency is improved as the dispersed particle size decreases.

Further, when the dispersed particle size is 100 nm or less, scattered light is very small, which is preferable. From the standpoint of avoiding light scattering, it is preferable that the dispersed particle size is small, and when the dispersed particle size is 1 nm or more, industrial production is easy.

When the dispersed particle size is 800 nm or less, an infrared-absorbing fine particle dispersion that is obtained by dispersing the infrared-absorbing fine particles according to the present invention in a medium can have a haze value of 30% or less when the visible light transmittance is 85% or less. When the haze value is larger than 30%, the infrared-absorbing fine particle dispersion becomes like frosted glass, and clear transparency cannot be obtained.

Note that the dispersed particle size of the infrared-absorbing fine particles can be measured using ELS-8000 manufactured by Otsuka Electronics Co., Ltd., based on a dynamic light scattering method, for example.

Further, in the tungsten oxide fine particles and the composite tungsten oxide fine particles, a so-called "Magneli phase" having a composition ratio represented by $2.45 \leq z/y \leq 2.999$ is chemically stable and has a good absorption property in the infrared region. Therefore, the tungsten oxide fine particles and the composite tungsten oxide fine particles are preferable as infrared-absorbing fine particles.

(4) Crystallite Size of Tungsten Oxide Fine Particles and Composite Tungsten Oxide Fine Particles From the standpoint of making the infrared-absorbing fine particles exhibit excellent heat resistance and excellent infrared absorption properties, the crystallite size of the infrared-absorbing fine particles is preferably 30 nm or more. Also, from the standpoint of reducing the haze value of an infrared-absorbing fine particle dispersion, which will be described later, the crystallite size of the infrared-absorbing fine particles is preferably 30 nm or more and 100 nm or less, more preferably 30 nm or more and 70 nm or less, and most preferably 30 nm or more and 60 nm or less.

The crystallite size of the tungsten oxide fine particles and the composite tungsten oxide fine particles according to the present invention will be described in the following order: (i) Method for measuring crystallite size, (ii) Influence of crystallite size on heat resistance, (iii) Influence of crystallite size on haze value, and (iv) Method for producing tungsten oxide fine particles and composite tungsten oxide fine particles.

(i) Method for Measuring Crystallite Size

The crystallite size of the tungsten oxide fine particles and the composite tungsten oxide fine particles is measured by measuring an X-ray diffraction pattern using a powder X-ray diffraction method ($\theta$-$2\theta$ method) and performing analysis using a Rietveld method. The X-ray diffraction pattern can be measured using a powder X-ray diffractometer "X'Pert-PRO/MPD" manufactured by Spectris Co., Ltd., PANalytical, for example.

(ii) Influence of Crystallite Size on Heat Resistance

The influence of the crystallite size of the tungsten oxide fine particles and the composite tungsten oxide fine particles on heat resistance will be described.

As described above, surfaces of infrared-absorbing fine particles are decomposed and degraded when exposed to heat, resulting in loss of the infrared absorption effect. The decomposition and degradation are caused by, for example, oxygen and harmful radicals that are generated in resin. At this time, if the value of the crystallite size of the infrared-absorbing fine particles is large, the specific surface area of the infrared-absorbing fine particles per unit mass is small. That is, a surface decomposition degradation ratio of the infrared-absorbing fine particles per unit mass is low. It is thought that, for this reason, the crystallite size of the tungsten oxide fine particles and the composite tungsten oxide fine particles being 30 nm or more contributes to improvement of the heat resistance.

(iii) Influence of Crystallite Size on Haze Value

The following describes the influence of the crystallite size of the tungsten oxide fine particles and the composite tungsten oxide fine particles on the haze value of an infrared-absorbing fine particle dispersion obtained by dispersing the infrared-absorbing fine particles according to the present invention in a medium.

As described above in (3) Tungsten oxide fine particles and composite tungsten oxide fine particles, the dispersed particle size is preferably 200 nm or less, and more preferably 100 nm or less when importance is placed on a reduction of scattering by the infrared-absorbing fine particles in the infrared-absorbing fine particle dispersion obtained by dispersing the infrared-absorbing fine particles according to the present invention in a medium. From this standpoint, the crystallite size of the tungsten oxide fine particles and the composite tungsten oxide fine particles is preferably 100 nm or less, and more preferably 70 nm or less.

(iv) Method for Producing Tungsten Oxide Fine Particles and Composite Tungsten Oxide Fine Particles Although there is no particular limitation on the method for producing tungsten oxide fine particles and composite tungsten oxide fine particles having a crystallite size of 30 nm or more, preferably 30 nm or more and 100 nm or less, more preferably 30 nm or more and 70 nm or less, and most preferably 30 nm or more and 60 nm or less, an example of the method will be described.

First, a tungsten oxide powder or a composite tungsten oxide powder having a crystallite size greater than 100 nm is prepared (in terms of commercially available products, a hexagonal cesium tungsten bronze ($Cs_{0.33}WO_z$, 2.0≤3.0) powder "CWO" (registered trademark), which is manufactured by Sumitomo Metal Mining Co., Ltd., has a crystallite size greater than 100 nm, and accordingly, can be preferably used). Then, the tungsten oxide powder or the composite tungsten oxide powder is pulverized and dispersed using a paint shaker or the like while the crystallite size of the powder is monitored. Conditions and a period for the pulverization and dispersion treatment are preferably determined so as to obtain infrared-absorbing fine particles having a crystallite size of 30 nm or more, preferably 30 nm or more and 100 nm or less, more preferably 30 nm or more and 70 nm or less, and most preferably 30 nm or more and 60 nm or less.

[2] Surface Treatment Agent Used to Coat Surfaces of Infrared-Absorbing Fine Particles A surface treatment agent used to coat surfaces of the infrared-absorbing fine particles according to the present invention is at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound.

The metal chelate compound and the metal cyclic oligomer compound are preferably metal alkoxide, metal acetylacetonate, or metal carboxylate, and accordingly, preferably have at least one selected from an ether bond, an ester bond, an alkoxy group, and an acetyl group.

Here, the surface treatment agent according to the present invention will be described in the following order: (1) Metal chelate compound, (2) Metal cyclic oligomer compound, (3) Hydrolysis product and polymer of metal chelate compound and metal cyclic oligomer compound, and (4) Addition amount of surface treatment agent.

(1) Metal Chelate Compound

The metal chelate compound used in the present invention is preferably one or two or more selected from Al-based, Zr-based, Ti-based, Si-based, and Zn-based chelate compounds having an alkoxy group.

Examples of aluminum-based chelate compounds include aluminum alcoholates such as aluminum ethylate, aluminum isopropylate, aluminum sec-butylate, mono-sec-butoxyaluminum diisopropylate and polymers thereof, ethyl acetoacetate aluminum diisopropylate, aluminum tris(ethyl acetoacetate), octyl acetoacetate aluminum diisopropylate, stearyl acetoaluminum diisopropylate, aluminum monoacetylacetonate bis(ethyl acetoacetate), and aluminum tris(acetylacetonate).

These compounds are aluminum chelate compounds having an alkoxy group obtained by dissolving aluminum alcoholate in an aprotic solvent, a petroleum-based solvent, a hydrocarbon-based solvent, an ester-based solvent, a ketone-based solvent, an ether-based solvent, an amide-based solvent, or the like, and adding β-diketone, β-ketoester, monohydric or polyhydric alcohol, fatty acid, or the like to the solution, and heating the mixture under reflux to cause a ligand displacement reaction.

Examples of zirconia-based chelate compounds include zirconium alcoholates such as zirconium ethylate and zirconium butyrate and polymers thereof, zirconium tributoxystearate, zirconium tetraacetylacetonate, zirconium tributoxyacetylacetonate, zirconium dibutoxy bis(acetylacetonate), zirconium tributoxyethyl acetoacetate, and zirconium butoxyacetylacetonate bis(ethyl acetoacetate).

Examples of titanium-based chelate compounds include titanium alcoholates such as methyl titanate, ethyl titanate, isopropyl titanate, butyl titanate, and 2-ethylhexyl titanate and polymers thereof, titanium acetylacetonate, titanium tetraacetylacetonate, titanium octylene glycolate, titanium ethyl acetoacetate, titanium lactate, and titanium triethanol aminate.

It is possible to use, as a silicon-based chelate compound, a tetrafunctional silane compound represented by a general formula $Si(OR)_4$ (where R is the same or different monovalent hydrocarbon group having 1 to 6 carbon atoms) or a hydrolysis product thereof. Specific examples of the tetrafunctional silane compound include tetramethoxysilane, tetraethoxysilane, tetrapropoxysilane, and tetrabutoxysilane. It is also possible to use a silane monomer (or oligomer) in which some or all alkoxy groups of these alkoxysilane monomers are hydrolyzed to form a silanol group (Si—OH), and a polymer that is self-condensed through hydrolysis reaction.

Further, examples of the hydrolysis product of a tetrafunctional silane compound (there is no appropriate technical term that refers to all intermediate products of the tetrafunctional silane compound) include: a silane monomer in which some or all alkoxy groups are hydrolyzed to form a silanol group (Si—OH), oligomers that are tetramer or pentamer, and polymers (silicone resin) having a weight average molecular weight (Mw) of about 800 to 8000. Note that in the course of the hydrolysis reaction, not all alkoxy silyl groups (Si—OR) in the alkoxysilane monomer are hydrolyzed to form a silanol group (Si—OH).

Preferable examples of zinc-based chelate compounds include zinc salts of organic carboxylic acids such as zinc octylate, zinc laurate, and zinc stearate, acetylacetone zinc chelate, benzoylacetone zinc chelate, dibenzoylmethane zinc chelate, and acetoacetate ethyl zinc chelate.

(2) Metal Cyclic Oligomer Compound

The metal cyclic oligomer compound according to the present invention is preferably at least one selected from Al-based, Zr-based, Ti-based, Si-based, and Zn-based cyclic oligomer compounds. Among these, cyclic aluminum oligomer compounds such as cyclic aluminum oxide octylate are preferable examples.

(3) Hydrolysis Product and Polymer of Metal Chelate Compound and Metal Cyclic Oligomer Compound In the present invention, surface-treated infrared-absorbing fine particles according to the present invention are obtained by coating surfaces of the infrared-absorbing fine particles according to the present invention with a hydrolysis product in which all alkoxy groups, ether bonds, and ester bonds in the above-described metal chelate compound or metal cyclic oligomer compound are hydrolyzed to form hydroxyl groups and carboxyl groups, a partially hydrolyzed partial hydrolysis product, and/or a polymer that is self-condensed through the hydrolysis reaction, to form a coating layer.

Namely, the hydrolysis product in the present invention is a concept including the partial hydrolysis product.

However, for example, in a reaction system in which an organic solvent such as alcohol is used, even if necessary and sufficient water exists in the system in terms of stoichiometric composition, generally, not all of the alkoxy groups, ether bonds, and ester bonds of the metal chelate compound or the metal cyclic oligomer compound serving as a starting material are hydrolyzed, depending on the type and concentration of the organic solvent. Accordingly, even after hydrolysis, the hydrolysis product may be amorphous with carbon C incorporated in the molecule of the hydrolysis product, depending on the conditions of a surface coating method, which will be described later.

As a result, the coating layer may contain an undecomposed metal chelate compound and/or metal cyclic oligomer compound, but this does not cause a problem so long as the amount of the undecomposed compound is small.

(4) Addition Amount of Surface Treatment Agent

The addition amount of the above-described metal chelate compound or metal cyclic oligomer compound is preferably 0.1 parts by mass or more and 1000 parts by mass or less in terms of metal elements, more preferably 1 part by mass or more and 500 parts by mass or less, and even more preferably 10 parts by mass or more and 150 parts by mass or less, with respect to 100 parts by mass of the infrared-absorbing fine particles.

This is because when the addition amount of the metal chelate compound or the metal cyclic oligomer compound is 0.1 parts by mass or more, hydrolysis products of these compounds and polymers of the hydrolysis products exert the effect of coating surfaces of the infrared-absorbing fine particles, and an effect of improving moist heat resistance can be obtained.

Further, when the addition amount of the metal chelate compound or the metal cyclic oligomer compound is 1000 parts by mass or less, excessive adsorption onto the infrared-absorbing fine particles can be avoided. Also, the improvement in the moist heat resistance due to the surfaces being coated is not saturated, and an improvement in the effect of coating the surfaces can be expected.

Further, when the addition amount of the metal chelate compound or the metal cyclic oligomer compound is 1000 parts by mass or less, it is possible to avoid a situation in which the amount of adsorption onto the infrared-absorbing fine particles is excessively large and the fine particles are easily granulated via the hydrolysis product of the metal chelate compound or the metal cyclic oligomer compound or the polymer of the hydrolysis product when the medium is removed. Good transparency can be ensured by avoiding the undesired granulation of the fine particles.

In addition, it is also possible to avoid an increase in a production cost due to an increase in the addition amount and the treatment time due to an excess of the metal chelate compound or the metal cyclic oligomer compound. Therefore, from an industrial point of view, the addition amount of the metal chelate compound or the metal cyclic oligomer compound is preferably 1000 parts by mass or less.

[3] Surface Coating Method

In a method for coating surfaces of the infrared-absorbing fine particles according to the present invention, first, the infrared-absorbing fine particles are dispersed in a suitable medium to prepare an infrared-absorbing fine particle dispersion liquid for forming the coating layer (which may be referred to as a "coating layer forming dispersion liquid" in the present invention). Then, a surface treatment agent is added to the prepared coating layer forming dispersion liquid, and the dispersion liquid is mixed and stirred. As a result, surfaces of the infrared-absorbing fine particles are coated with a coating layer that contains at least one selected from a hydrolysis product of a metal chelate compound, a polymer of the hydrolysis product of the metal chelate compound, a hydrolysis product of a metal cyclic oligomer compound, and a polymer of the hydrolysis product of the metal cyclic oligomer compound.

Here, the surface coating method according to the present invention will be described in the following order: (1) Preparation of coating layer forming dispersion liquid, (2) Preparation of coating layer forming dispersion liquid in which water is used as a medium, (3) Preparation of coating layer forming dispersion liquid in which water addition amount is adjusted, and (4) Treatment after mixing and stirring of the coating layer forming dispersion liquid.

(1) Preparation of Coating Layer Forming Dispersion Liquid

It is preferable that the tungsten oxide and/or the composite tungsten oxide, which are the infrared-absorbing fine particles, are finely pulverized in advance and are dispersed in a suitable medium to be in a monodispersed state in the coating layer forming dispersion liquid according to the present invention. It is important to ensure the dispersed state during the pulverization and dispersion step so as not to allow the fine particles to aggregate. This is for avoiding a situation in which the infrared-absorbing fine particles aggregate during the process of surface treatment of the fine particles, surfaces of the fine particles in the state of aggregates are coated, eventually, the aggregates remain in the infrared-absorbing fine particle dispersion, which will be described later, and transparency of the infrared-absorbing fine particle dispersion decreases.

As a result of the pulverization and dispersion treatment being performed on the coating layer forming dispersion liquid according to the present invention, when the surface treatment agent according to the present invention is added, individual infrared-absorbing fine particles can be coated uniformly and firmly with a hydrolysis product of the surface treatment agent or a polymer of the hydrolysis product.

Specific methods for the pulverization and dispersion treatment include pulverization and dispersion treatment methods performed using devices such as a bead mill, a ball mill, a sand mill, a paint shaker, and an ultrasonic homogenizer. Among these, pulverization and dispersion treatment performed using a medium such as beads, balls, or Ottawa sand and a medium stirring mill such as a bead mill, a ball mill, a sand mill, or a paint shaker is preferable because the time required for the particles to reach a desired dispersed particle size is short.

(2) Preparation of Coating Layer Forming Dispersion Liquid in which Water is Used as a Medium The inventors of the present invention found that in the preparation of the coating layer forming dispersion liquid described above, it is preferable that the surface treatment agent according to the present invention is added to the coating layer forming dispersion liquid in which water is used as a medium, while the dispersion liquid is stirred and mixed, and further, a hydrolysis reaction of the added metal chelate compound or metal cyclic oligomer compound is immediately completed. In the present invention, the coating layer forming dispersion liquid may be referred to as the "coating layer forming dispersion liquid in which water is used as a medium".

It is thought that the preparation of the coating layer forming dispersion liquid is affected by a reaction sequence of the added surface treatment agent according to the present invention. Namely, in the coating layer forming dispersion liquid in which water is used as a medium, the hydrolysis reaction of the surface treatment agent always precedes a polymerization reaction of a generated hydrolysis product. It is thought that as a result, the amount of residual carbon C in molecules of the surface treatment agent present in the coating layer can be reduced, when compared with a case in which water is not used as the medium. It is thought that a coating layer having a high density can be formed by reducing the amount of residual carbon C in molecules of the surface treatment agent present in the coating layer.

Note that the metal chelate compound, the metal cyclic oligomer compound, hydrolysis products thereof, and polymers of the hydrolysis products may be decomposed to metal ions in the above-described coating layer forming dispersion liquid in which water is used as a medium, immediately after the start of the addition. However, in this case, the decomposition to the metal ions ends when the dispersion liquid has become a saturated aqueous solution.

On the other hand, in the coating layer forming dispersion liquid in which water is used as a medium, a dispersion concentration of the tungsten oxide and/or the composite tungsten oxide in the coating layer forming dispersion liquid is preferably 0.01 mass % or more and 80 mass % or less. When the dispersion concentration is within this range, the pH can be set to 8 or less, and the dispersed state of the infrared-absorbing fine particles according to the present invention is maintained by electrostatic repulsion.

It is thought that as a result, surfaces of all the infrared-absorbing fine particles are coated with a coating layer that contains at least one selected from a hydrolysis product of the metal chelate compound, a polymer of the hydrolysis product of the metal chelate compound, a hydrolysis product of the metal cyclic oligomer compound, and a polymer of the hydrolysis product of the metal cyclic oligomer compound, and the surface-treated infrared-absorbing fine particles according to the present invention are generated.

(3) Preparation of Coating Layer Forming Dispersion Liquid in which Water Addition Amount is Adjusted As a variation of the above-described method for preparing the coating layer forming dispersion liquid in which water is used as a medium, there is also a method for realizing the above-described reaction sequence while adjusting the addition amount of water to an appropriate value, using an organic solvent as a medium in the coating layer forming dispersion liquid. In the present invention, the coating layer forming dispersion liquid may be referred to as a "coating layer forming dispersion liquid in which an organic solvent is used as a medium".

This preparation method is convenient when it is desired to reduce the amount of water contained in the coating layer forming dispersion liquid for the sake of convenience in a subsequent step.

Specifically, the surface treatment agent according to the present invention and pure water are dropped in parallel while the coating layer forming dispersion liquid in which an organic solvent is used as a medium is stirred and mixed. At this time, the temperature of the medium, which affects a reaction rate, and a dropping rate of the surface treatment agent and pure water are appropriately controlled. Note that any solvent that dissolves in water at room temperature, such as an alcohol-based, ketone-based, or glycol-based solvent may be used as the organic solvent, and various solvents can be selected.

(4) Treatment after Mixing and Stirring of Coating Layer Forming Dispersion Liquid The surface-treated infrared-absorbing fine particles according to the present invention obtained in the above-described step for preparing the coating layer forming dispersion liquid can be used as a raw material of the infrared-absorbing fine particle dispersion in a fine particle state or in a state where the fine particles are dispersed in a liquid medium or a solid medium.

Namely, the generated surface-treated infrared-absorbing fine particles need not be further subjected to heat treatment to increase the density or chemical stability of the coating layer. This is because the density and adhesiveness of the coating layer are already high enough to achieve desired moist heat resistance even if the heat treatment is not performed.

Naturally, it is possible to perform heat treatment on the coating layer forming dispersion liquid or a surface-treated infrared-absorbing fine particle powder for the purpose of obtaining the surface-treated infrared-absorbing fine particle powder from the coating layer forming dispersion liquid or drying the obtained surface-treated infrared-absorbing fine particle powder, for example. However, in this case, care should be taken so that the heat treatment temperature will not exceed a temperature at which the surface-treated infrared-absorbing fine particles firmly aggregate to form hard aggregates.

This is because the surface-treated infrared-absorbing fine particles according to the present invention are often required to be transparent in an infrared-absorbing fine particle dispersion in which the fine particles are finally used, due to an intended use of the particles. If the infrared-absorbing fine particle dispersion is produced using aggregates as the infrared-absorbing material, the obtained dispersion has a high haze (haze value). If the heat treatment is performed at a temperature higher than the temperature at which hard aggregates are formed, the aggregates are redispersed through dry crushing and/or wet crushing in order to achieve transparency of the infrared-absorbing fine particle dispersion. However, it is conceivable that when the aggregates are redispersed by being crushed, the coating layer on the surfaces of the surface-treated infrared-absorbing fine particles may be damaged or partially peel off and the surfaces of the fine particles may be exposed.

As described above, the surface-treated infrared-absorbing fine particles according to the present invention need not be subjected to heat treatment after the mixing and stirring, and therefore, do not firmly aggregate, and dispersion treatment for crushing hard aggregates need not be performed or can be completed in a short time. As a result, the coating layer of the surface-treated infrared-absorbing fine particles according to the present invention can be kept from being damaged, and remains coated on the individual infrared-absorbing fine particles. An infrared-absorbing fine particle dispersion produced using the surface-treated infrared-absorbing fine particles is considered to exhibit superior moist heat resistance to those obtained using conventional methods.

Furthermore, as described above, a coating layer having a high density can be formed by reducing the amount of residual carbon C in molecules of the surface treatment agent present in the coating layer. From this standpoint, the carbon concentration in the surface-treated infrared-absorbing fine particle powder constituted by the surface-treated infrared-absorbing fine particles is preferably 0.2 mass % or more and 5.0 mass % or less, and more preferably 0.5 mass % or more and 3.0 mass % or less.

[4] Infrared-Absorbing Fine Particle Dispersion Liquid, Infrared-Absorbing Fine Particle Dispersion, and Infrared-Absorbing Substrate Obtained Using Surface-Treated Infrared-Absorbing Fine Particles According to the Present Invention, and Article The following describes infrared-absorbing fine particle dispersions and articles that are obtained using the surface-treated infrared-absorbing fine particles according to the present invention in the following order: (1) Infrared-absorbing fine particle dispersion liquid, (2) Infrared-absorbing fine particle dispersion, (3) Infrared-absorbing substrate, and (4) Article obtained using infrared-absorbing fine particle dispersion or infrared-absorbing substrate.

(1) Infrared-Absorbing Fine Particle Dispersion Liquid

An infrared-absorbing fine particle dispersion liquid according to the present invention is constituted by a liquid medium and the surface-treated infrared-absorbing fine particles according to the present invention dispersed in the liquid medium. As the liquid medium, one or more liquid media selected from organic solvents, fats and oils, liquid plasticizers, compounds polymerized by curing, and water can be used.

The infrared-absorbing fine particle dispersion liquid according to the present invention will be described in the following order: (i) Production method, (ii) Organic solvent to be used, (iii) Fats and oils to be used, (iv) Liquid plasticizer to be used, (v) Compound polymerized by curing to be used, (vi) Dispersant to be used, and (vii) Method for using infrared-absorbing fine particle dispersion liquid.

(i) Production Method

In production of the infrared-absorbing fine particle dispersion liquid according to the present invention, the coating layer forming dispersion liquid described above is dried by being heated under conditions in which the surface-treated infrared-absorbing fine particles can be kept from firmly aggregating, or by being subjected to vacuum fluidized drying, spray drying, or the like at room temperature to obtain a surface-treated infrared-absorbing fine particle powder according to the present invention. Then, the surface-treated infrared-absorbing fine particle powder is added to the above-described liquid medium to be redispersed therein. In another preferable configuration, the infrared-absorbing fine particle dispersion liquid is produced by separating the coating layer forming dispersion liquid into the surface-treated infrared-absorbing fine particles and the medium, and replacing the medium of the coating layer forming dispersion liquid with the medium of the infrared-absorbing fine particle dispersion liquid (so-called solvent substitution).

In a treatment performed using the vacuum fluidized drying, drying and crushing are simultaneously performed in a reduced pressure atmosphere, and therefore, the drying rate is high and the surface-treated infrared-absorbing fine particles can be kept from aggregating. Also, since drying is performed in the reduced pressure atmosphere, volatile components can be removed at a relatively low temperature, and the amount of residual volatile components can be reduced as much as possible. Also, in a treatment performed using the spray drying, secondary aggregation due to surface force of volatile components is unlikely to occur, and the surface-treated infrared-absorbing fine particles in which secondary aggregation is suppressed can be obtained even if crushing is not performed.

On the other hand, in another preferable configuration, the same medium is used as the medium of the coating layer forming dispersion liquid and the medium of the infrared-absorbing fine particle dispersion liquid in advance, and the coating layer forming dispersion liquid after the surface treatment is used as is as the infrared-absorbing fine particle dispersion liquid.

(ii) Organic Solvent to be Used

Examples of organic solvents that can be used for the infrared-absorbing fine particle dispersion liquid according to the present invention include alcohol-based organic solvents, ketone-based organic solvents, hydrocarbon-based organic solvents, glycol-based organic solvents, and water-based organic solvents.

Specifically, it is possible to use: alcohol-based solvents such as methanol, ethanol, 1-propanol, isopropanol, butanol, pentanol, benzyl alcohol, and diacetone alcohol;

ketone-based solvents such as acetone, methyl ethyl ketone, methyl propyl ketone, methyl isobutyl ketone, cyclohexanone, and isophorone;

ester-based solvents such as 3-methyl-methoxy-propionate;

glycol derivatives such as ethylene glycol monomethyl ether, ethylene glycol monoethyl ether, ethylene glycol isopropyl ether, propylene glycol monomethyl ether, propylene glycol monoethyl ether, propylene glycol methyl ether acetate, and propylene glycol ethyl ether acetate;

amides such as formamide, N-methylformamide, dimethylformamide, dimethylacetamide, and N-methyl-2-pyrrolidone;

aromatic hydrocarbons such as toluene and xylene; and ethylene chloride, chlorobenzene, etc.

Among these organic solvents, particularly, dimethyl ketone, methyl ethyl ketone, methyl isobutyl ketone, toluene, propylene glycol monomethyl ether acetate, n-butyl acetate, etc., can be preferably used.

(iii) Fats and Oils to be Used

Vegetable fats and oils or vegetable-derived fats and oils are preferably used as fats and oils used for the infrared-absorbing fine particle dispersion liquid according to the present invention.

Examples of vegetable oils that can be used include dry oils such as linseed oil, sunflower oil, tung oil, and perilla oil, semi-dry oils such as sesame oil, cottonseed oil, rapeseed oil, soybean oil, rice bran oil, and poppy oil, and non-dry oils such as olive oil, coconut oil, palm oil, and dehydrated castor oil.

Examples of compounds derived from vegetable oils that can be used include fatty acid monoesters, ethers, etc., obtained by directly esterifying fatty acids of the vegetable oils with monoalcohols.

Further, commercially available petroleum-based solvents can also be used as fats and oils.

Examples of commercially available petroleum-based solvents that can be used include ISOPAR (registered trademark) E and EXXSOL (registered trademark) Hexane, Heptane, E, D30, D40, D60, D80, D95, D110, D130 (all manufactured by Exxon Mobil Corporation).

(iv) Liquid Plasticizer to be Used

Examples of liquid plasticizers that can be used for the infrared-absorbing fine particle dispersion liquid according to the present invention include a plasticizer that is a compound of a monohydric alcohol and an organic acid ester, an ester-based plasticizer such as a polyhydric alcohol organic acid ester compound, and a phosphoric acid-based plasticizer such as an organic phosphoric acid-based plasticizer. Note that plasticizers that are liquid at room temperature are preferable.

Among these, a plasticizer that is an ester compound synthesized from a polyhydric alcohol and a fatty acid can be preferably used. The ester compound synthesized from a polyhydric alcohol and a fatty acid is not particularly limited, but it is possible to use, for example, a glycol-based ester compound that is obtained through a reaction between glycol such as triethylene glycol, tetraethylene glycol, or tripropylene glycol and a monobasic organic acid such as butyric acid, isobutyric acid, caproic acid, 2-ethylbutyric acid, heptylic acid, n-octylic acid, 2-ethylhexylic acid, pelargonic acid (n-nonylic acid), or decylic acid.

It is also possible to use ester compounds obtained through a reaction between tetraethylene glycol or tripropylene glycol and the above-described monobasic organic acid.

Among these, fatty acid esters of triethylene glycol such as triethylene glycol dihexanate, triethylene glycol di-2-ethyl butyrate, triethylene glycol di-octanoate, and triethylene glycol di-2-ethyl hexanonate can be used. Further, fatty acid esters of triethylene glycol can also be preferably used.

(v) Compound Polymerized by Curing to be Used

Compounds that are polymerized by curing and can be used for the infrared-absorbing fine particle dispersion liquid according to the present invention are monomers and oligomers that form a polymer through polymerization or the like.

Specific examples include methyl methacrylate monomers, acrylate monomers, and styrene resin monomer.

Two or more of the above-described liquid media can be used in combination. Further, the pH may be adjusted by adding an acid or alkali to the liquid media as necessary.

(vi) Dispersant to be Used

It is also preferable to add various dispersants, surfactants, coupling agents, or the like to the infrared-absorbing fine particle dispersion liquid according to the present invention in order to further improve dispersion stability of the surface-treated infrared-absorbing fine particles and avoid coarsening of the dispersed particle size due to re-aggregation.

The dispersants, coupling agents, and surfactants can be selected according to the application, but those having an amine-containing group, a hydroxyl group, a carboxyl group, a sulfo group, or an epoxy group as a functional group are preferable. These functional groups have an effect of adsorbing on surfaces of the surface-treated infrared-absorbing fine particles to prevent aggregation and uniformly disperse the fine particles. Polymeric dispersants having any of these functional groups in the molecule are more preferable.

Also, acrylic-styrene copolymer-based dispersants having a functional group are preferable dispersants. Among those, more preferable examples are an acrylic-styrene copolymer-based dispersant having a carboxyl group as a functional group and an acrylic dispersant having a functional group containing an amine. A dispersant having a functional group containing an amine preferably has a molecular weight Mw of 2000 to 200000 and an amine value of 5 to 100 mgKOH/g. A dispersant having a carboxyl group preferably has a molecular weight Mw of 2000 to 200000 and an acid value of 1 to 50 mgKOH/g.

Specific examples of commercially available dispersants that can be preferably used include: SOLSPERSE (registered trademark, the same applies to the following) 3000, 5000, 9000, 11200, 12000, 13000, 13240, 13650, 13940, 16000, 17000, 18000, 20000, 21000, 24000SC, 24000GR, 26000, 27000, 28000, 31845, 32000, 32500, 32550, 32600, 33000, 33500, 34750, 35100, 35200, 36600, 37500, 38500, 39000, 41000, 41090, 53095, 55000, 56000, 71000, 76500, J180, J200, and M387 manufactured by Lubrizol; SOL- PLUS (registered trademark, the same applies to the following) D510, D520, D530, D540, DP310, K500, L300, L400, and R700; Disperbyk (registered trademark, the same applies to the following)—101, 102, 103, 106, 107, 108, 109, 110, 111, 112, 116, 130, 140, 142, 145, 154, 161, 162, 163, 164, 165, 166, 167, 168, 170, 171, 174, 180, 181, 182, 183, 184, 185, 190, 191, 192, 2000, 2001, 2009, 2020, 2025, 2050, 2070, 2095, 2096, 2150, 2151, 2152, 2155, 2163, and 2164, Anti-Terra (registered trademark, the same applies to the following)—U, 203, and 204 manufactured by BYK Japan KK; BYK (registered trademark, the same applies to the following)—P104, P104S, P105, P9050, P9051, P9060, P9065, P9080, 051, 052, 053, 054, 055, 057, 063, 065, 066N, 067A, 077, 088, 141, 220S, 300, 302, 306, 307, 310, 315, 320, 322, 323, 325, 330, 331, 333, 337, 340, 345, 346, 347, 348, 350, 354, 355, 358N, 361N, 370, 375, 377, 378, 380N, 381, 392, 410, 425, 430, 1752, 4510, 6919, 9076, 9077, W909, W935, W940, W961, W966, W969, W972, W980, W985, W995, W996, W9010, Dynwet800, Siclean3700, UV3500, UV3510, and UV3570; EFKA (registered trademark, the same applies to the following) 2020, 2025, 3030, 3031, 3236, 4008, 4009, 4010, 4015, 4020, 4046, 4047, 4050, 4055, 4060, 4080, 4300, 4310, 4320, 4330, 4340, 4400, 4401, 4402, 4403, 4500, 5066, 5220, 6220, 6225, 6230, 6700, 6780, 6782, 7462, and 8503 manufactured by EFKA Additives; JONCRYL (registered trademark, the same applies to the following) 67, 678, 586, 611, 680, 682, 690, 819, and -JDX5050 manufactured by BASF Japan Ltd.; TERPLUS (registered trademark, the same applies to the following) MD1000, D1180, and D1130 manufactured by Otsuka Chemical Co., Ltd.; AJISPER (registered trademark, the same applies to the following) PB-711, PB-821, and PB-822 manufactured by Ajinomoto Fine-Techno Co., Inc.; DISPARON (registered trademark, the same applies to the following) 1751N, 1831, 1850, 1860, 1934, DA-400N, DA-703-50, DA-325, DA-375, DA-550, DA-705, DA-725, DA-1401, DA-7301, DN-900, NS-5210, and NVI-8514L manufactured by Kusumoto Chemicals, Ltd.; ARUFON (registered trademark, the same applies to the following) UH-2170, UC-3000, UC-3910, UC-3920, UF-5022, UG-4010, UG-4035, UG-4040, and UG-4070, RESEDA (registered trademark, the same applies to the following) GS-1015, GP-301, and GP-301S manufactured by TOAGOSEI CO., LTD.; and DIANAL (registered trademark, the same applies to the following) BR-50, BR-52, BR-60, BR-73, BR-77, BR80, BR-83, BR85, BR87, BR88, BR-90, BR-96, BR102, BR-113, and BR116 manufactured by Mitsubishi Chemical Corporation.

(vii) Method for Using Infrared-Absorbing Fine Particle Dispersion Liquid

The infrared-absorbing fine particle dispersion liquid according to the present invention produced as described above can be used to coat a surface of a suitable substrate and form a dispersion film on the surface to use the substrate as an infrared-absorbing substrate. Namely, the dispersion film is a dry solidified product of the infrared-absorbing fine particle dispersion liquid.

It is also possible to obtain an infrared-absorbing fine particle dispersion in powder form (which may be referred to as a "dispersion powder" in the present invention) according to the present invention by drying the infrared-absorbing fine particle dispersion liquid and performing pulverization. Namely, the dispersion powder is a dry solidified product of the infrared-absorbing fine particle dispersion liquid. The dispersion powder is a dispersion in powder form obtained by dispersing the surface-treated infrared-absorbing fine particles in a solid medium (e.g., a dispersant), and is distinguished from the surface-treated infrared-absorbing fine particle powder described above. The dispersion powder contains a dispersant, and therefore, the surface-treated infrared-absorbing fine particles can be easily redispersed in a suitable medium by mixing the dispersion powder with the medium.

The dispersion powder can be used as a raw material to add the surface-treated infrared-absorbing fine particles in a dispersed state to an infrared absorbing product. Namely, the dispersion powder, which is obtained by dispersing the surface-treated infrared-absorbing fine particles according to the present invention in a solid medium, may be redispersed in a liquid medium to be used as a dispersion liquid for an infrared absorbing product, or may be used in a state of being kneaded into resin as described later.

On the other hand, an infrared-absorbing fine particle dispersion liquid obtained by mixing and dispersing the surface-treated infrared-absorbing fine particles according to the present invention in a liquid medium is used for various applications that use photothermal conversion.

For example, it is possible to obtain a curable ink composition by adding the surface-treated infrared-absorbing fine particles according to the present invention to uncured thermosetting resin, or by dispersing the surface-treated infrared-absorbing fine particles in a suitable solvent, and thereafter adding uncured thermosetting resin thereto. The curable ink composition exhibits excellent adhesion to a predetermined substrate when applied to the substrate and cured by being irradiated with infrared rays or the like. The curable ink composition is not only used for conventional uses of ink, but also is the most suitable curable ink composition for laser beam lithography in which a three-dimensional object is formed by applying a predetermined amount of the ink composition, irradiating the ink composition with electromagnetic waves such as infrared rays to cure the composition, and stacking the thus formed layers.

(2) Infrared-Absorbing Fine Particle Dispersion

The infrared-absorbing fine particle dispersion according to the present invention is obtained by dispersing the surface-treated infrared-absorbing fine particles according to the present invention in a solid medium. Resin, glass, or the like can be used as the solid medium.

The infrared-absorbing fine particle dispersion according to the present invention will be described in the following order: (i) Production method, (ii) Moist heat resistance, (iii) Heat resistance, and (iv) Haze value.

(i) Production Method

In a case where the surface-treated infrared-absorbing fine particles according to the present invention are kneaded into resin to form a film or a board, the surface-treated infrared-absorbing fine particles can be directly kneaded into the resin. Alternatively, it is also possible to mix the above-described infrared-absorbing fine particle dispersion liquid with resin, or add a dispersion in powder form obtained by dispersing the surface-treated infrared-absorbing fine particles in a solid medium to a liquid medium to be mixed with resin.

In a case where resin is used as the solid medium, for example, a film or a board having a thickness of 0.1 μm to 50 mm may be formed.

When the surface-treated infrared-absorbing fine particles according to the present invention are kneaded into resin, commonly, the surface-treated infrared-absorbing fine particles and the resin are mixed while being heated at a temperature (about 200° C. to 300° C.) around the melting point of the resin.

In this case, it is also possible to form pellets by mixing the surface-treated infrared-absorbing fine particles with resin, and form the pellets into a film or a board using various methods. For example, the film or the board can be formed using an extrusion molding method, an inflation molding method, a solution casting method, a casting method, or the like. At this time, the thickness of the film or the board can be set as appropriate for an intended use, and the amount of filler (i.e., amount of the surface-treated infrared-absorbing fine particles according to the present invention) relative to the resin can be varied depending on the thickness of a substrate, required optical properties, and mechanical properties, but it is commonly preferable that the amount of filler is 50 mass % or less relative to the resin.

When the amount of filler relative to the resin is 50 mass % or less, granulation of the fine particles can be avoided in the resin in the solid state, and accordingly, good transparency can be maintained. Also, the amount of use of the surface-treated infrared-absorbing fine particles according to the present invention can be controlled, which is advantageous in terms of cost.

On the other hand, the infrared-absorbing fine particle dispersion obtained by dispersing the surface-treated infrared-absorbing fine particles according to the present invention in a solid medium can also be used in a state of being further pulverized to be a powder. If this configuration is adopted, in the infrared-absorbing fine particle dispersion in powder form, the surface-treated infrared-absorbing fine particles according to the present invention are already sufficiently dispersed in the solid medium. Therefore, it is possible to easily produce an infrared-absorbing fine particle dispersion in a liquid state or a solid state by using the infrared-absorbing fine particle dispersion in powder form as so-called masterbatch, and dissolving the dispersion in a suitable liquid medium or kneading the dispersion with resin pellets or the like.

The resin that serves as matrix of the above-described film or board is not particularly limited, and can be selected according to the application. It is possible to use PET resin, acrylic resin, polyamide resin, vinyl chloride resin, polycarbonate resin, olefin resin, epoxy resin, polyimide resin, and the like, as low-cost resins that have a high degree of transparency and are highly versatile. It is also possible to use fluorocarbon resin from the standpoint of weather resistance.

(ii) Moist Heat Resistance

When the infrared-absorbing fine particle dispersion according to the present invention of which visible light transmittance is set to around 80% is exposed to a moist heat atmosphere with a temperature of 85° C. and a relative humidity of 90% for 9 days, the infrared-absorbing fine particle dispersion exhibits excellent moist heat resistance, with a change in the solar transmittance of 2.0% or less between before and after the exposure.

(iii) Heat Resistance

When the infrared-absorbing fine particle dispersion according to the present invention of which visible light transmittance is set to around 80% is exposed to an air atmosphere with a temperature of 120° C. for 30 days, the infrared-absorbing fine particle dispersion exhibits excellent heat resistance, with a change in the solar transmittance of 6.0% or less between before and after the exposure.

(iv) Haze Value

The infrared-absorbing fine particle dispersion according to the present invention has a haze value no greater than 1.5% when the visible light transmittance is around 80%, and exhibits excellent visibility.

(3) Infrared-Absorbing Substrate

An infrared-absorbing substrate according to the present invention is obtained by forming a dispersion film that contains the surface-treated infrared-absorbing fine particles according to the present invention as a coating layer on at least one surface of at least one predetermined substrate.

Due to the dispersion film containing the surface-treated infrared-absorbing fine particles according to the present invention being formed as the coating layer on the surface of the predetermined substrate, the infrared-absorbing substrate according to the present invention has excellent moist heat resistance and chemical stability, and can be preferably used as an infrared-absorbing material.

The infrared-absorbing substrate according to the present invention will be described in the following order: (i) Production method, (ii) Moist heat resistance, (iii) Heat resistance, and (iv) Haze value.

(i) Production Method

For example, the surface-treated infrared-absorbing fine particles according to the present invention, a liquid medium such as water or an organic solvent such as an alcohol, a resin binder, and a dispersant, if desired, are mixed to obtain an infrared-absorbing fine particle dispersion liquid. The obtained infrared-absorbing fine particle dispersion liquid is applied to a surface of a suitable substrate, and thereafter the liquid medium is removed and the resin binder is cured to obtain an infrared-absorbing substrate in which the infrared-absorbing fine particle dispersion is directly laminated on the surface of the substrate as a coating layer.

The resin binder can be selected according to the application, and examples of the binder resin include ultraviolet curable resin, thermosetting resin, room temperature curable resin, and thermoplastic resin. Alternatively, a layer may be formed on the surface of the substrate by using an infrared-absorbing fine particle dispersion liquid that does not contain a resin binder, and it is also possible to apply a liquid medium that contains a binder component to the thus formed layer of the infrared-absorbing fine particle dispersion.

A specific example of the infrared-absorbing substrate is obtained by applying, to a surface of a predetermined substrate, an infrared-absorbing fine particle dispersion liquid obtained by dispersing the surface-treated infrared-absorbing fine particles according to the present invention in at least one liquid medium selected from an organic solvent, an organic solvent in which resin is dissolved, an organic solvent in which resin is dispersed, and water, and by solidifying the thus formed coating layer using a suitable method. Another example of the infrared-absorbing substrate is obtained by applying, to the surface of the substrate, an infrared-absorbing fine particle dispersion liquid that contains a resin binder, and solidifying the thus formed coating layer using a suitable method. Yet another example of the infrared-absorbing substrate is obtained by applying, to the surface of the predetermined substrate, an infrared-absorbing fine particle dispersion liquid obtained by mixing a predetermined medium and an infrared-absorbing fine particle dispersion obtained by dispersing the surface-treated infrared-absorbing fine particles in a solid medium in powder form, and by solidifying the thus formed coating layer using a suitable method. As a matter of course, there is also an infrared-absorbing substrate that is obtained by applying, to the surface of the predetermined substrate, an infrared-absorbing fine particle dispersion liquid obtained by mixing two or more of the above-described infrared-absorbing fine particle dispersion liquids, and by solidifying the thus formed coating layer using a suitable method.

It is possible to impart abrasion resistance to the infrared-absorbing substrate according to the present invention by adding a glass coating agent to the infrared-absorbing fine particle dispersion liquid.

For example, a metal alkoxide or a metal organic compound containing one or more of Sn, Ti, In, Si, Zr, and Al can be used as the glass coating agent to be contained in the infrared-absorbing fine particle dispersion liquid. In particular, compounds containing Si are preferable, and it is preferable to use a silane coupling agent, a silane-based alkoxide, a polyorganosiloxane, a polysilazane, or an organosilicon compound having organic groups bonded to a silicon atom, with one or more of the organic groups being an organic group having a reactive functional group. All of these are preferably liquid at room temperature.

Examples of polysilazanes that can be used include perhydropolysilazane, partially organic polysilazane, and organosilazane.

Preferable organosilicon compounds that have organic groups bonded to a silicon atom, with one or more of the organic groups being an organic group having a reactive functional group are Si-containing compounds having an amino group, a mercapto group, an epoxy group, and a (meth)acryloyloxy group as reactive groups For example, it is possible to use 3-(meth)acryloyloxypropyltrimethoxysilane, 3-(meth)acryloyloxypropyltriethoxysilane, 3-(meth)acryloyloxypropylmethyldimethoxysilane, 3-aminopropyltrimethoxysilane, 3-aminopropyltriethoxysilane, 3-aminopropylmethyldimethoxysilane, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, 3-ureidopropyltriethoxysilane, N—(N-vinylbenzyl-2-aminoethyl)-3-aminopropyltrimethoxysilane, N-phenyl-3-aminopropyltrimethoxysilane, 3-mercaptopropyltrimethoxysilane, 3-mercaptopropyltriethoxysilane, 3-mercaptopropylmethyldimethoxysilane, 3-mercaptopropylmethyldiethoxysilane, 3-glycidoxypropyltrimethoxysilane, 3-glycidoxypropylmethyldimethoxysilane, 3-glycidoxypropyltriethoxysilane, 3-isocyanatepropyltrimethoxysilane, 3-isocyanatepropyltriethoxysilane, 3-isocyanatepropylmethyldimethoxysilane, 3-isocyanatepropylmethyldiethoxysilane, etc.

When the glass coating agent is at least one selected from silane coupling agents and silane-based alkoxides, it is preferable that the liquid medium is at least one selected from aromatic hydrocarbons, ketones, ethers, alcohols, and water. Further, when the glass coating agent is at least one selected from polysilazanes and polyorganosilanes, it is preferable that the liquid medium is at least one selected from aromatic hydrocarbons, ketones, and ethers.

It is also preferable to add an acid to the infrared-absorbing fine particle dispersion liquid according to the present invention from the standpoint of promoting hydrolysis of a hydrolyzable silicon monomer or the like that is contained in the above-described glass coating agent.

Examples of acids that can be used for the infrared-absorbing fine particle dispersion liquid according to the present invention include nitric acid, hydrochloric acid, sulfuric acid, trichloroacetic acid, trifluoroacetic acid, phosphoric acid, methanesulfonic acid, paratoluenesulfonic acid, and oxalic acid. Volatile acids are preferable because they volatilize when heated and do not remain in the cured layer.

The acid acts as a catalyst that promotes the hydrolysis of the hydrolyzable silicon monomer and a partially hydrolyzed condensate of the silicon monomer. The amount of the acid contained in the dispersion liquid can be set without particular limitation so long as the acid can serve as the catalyst, but the volume ratio of the acid is preferably about 0.001 to 0.1 mol/L relative to a total amount of the infrared-absorbing fine particle dispersion liquid.

There is no particular limitation on the material of the above-described substrate so long as the substrate is transparent, but the substrate is preferably at least one selected from a glass substrate and a resin substrate. A resin board, a resin sheet, and a resin film are preferably used as resin substrates.

There is no particular limitation on the resin used for the resin board, the resin sheet, and the resin film so long as no problem arises in a surface condition and durability required for the board, the sheet, and the film. Examples of the substrate include a board, a sheet, and a film made of transparent polymers such as: polyester-based polymers such as polyethylene terephthalate and polyethylene naphthalate; cellulose-based polymers such as diacetyl cellulose and triacetyl cellulose; polycarbonate-based polymers; acrylic polymers such as polymethyl methacrylate; styrenic polymers such as polystyrene and acrylonitrile-styrene copolymers; olefinic polymers such as polyethylene, polypropylene, polyolefin having a cyclic or norbornene structure, and ethylene-propylene copolymers; vinyl chloride-based polymers; amide-based polymers such as aromatic polyamide; imide-based polymers; sulfone-based polymers; polyethersulfone-based polymers; polyetheretherketone-based polymers; polyphenylene sulfide-based polymers; vinyl alcohol-based polymers; vinylidene chloride-based polymers; vinyl butyral-based polymers; allylate-based polymers; polyoxymethylene-based polymers; epoxy-based polymers; and various binary, ternary copolymers, graft copolymers, and blends thereof. In particular, a polyester-based biaxially oriented film made of polyethylene terephthalate, polybutylene terephthalate, polyethylene-2,6-naphthalate, or the like is more preferable in terms of mechanical properties, optical properties, heat resistance, and economy. The polyester-based biaxially oriented film may be a copolymerized polyester-based film.

(ii) Moist Heat Resistance

When the infrared-absorbing substrate of which visible light transmittance is set to around 80% is exposed to a moist heat atmosphere with a temperature of 85° C. and a relative humidity of 90% for 9 days, the infrared-absorbing substrate exhibits excellent moist heat resistance, with a change in the solar transmittance of 4.0% or less between before and after the exposure.

(iii) Heat Resistance

When the infrared-absorbing substrate of which visible light transmittance is set to around 80% is exposed to an air atmosphere with a temperature of 120° C. for 30 days, the infrared-absorbing substrate exhibits excellent heat resistance, with a change in the solar transmittance of 2.0% or less between before and after the exposure.

(iv) Haze Value

The infrared-absorbing substrate according to the present invention has a haze value no greater than 1.5% when the visible light transmittance is around 80%, and exhibits excellent visibility.

(4) Article Obtained Using Infrared-Absorbing Fine Particle Dispersion or Infrared-Absorbing Substrate As described above, infrared absorbing articles such as a film and a board that are the infrared-absorbing fine particle dispersion or the infrared-absorbing substrate according to the present invention are excellent in the moist heat resistance, the heat resistance, and chemical stability, and have low haze and accordingly are excellent in visibility.

Therefore, these infrared absorbing articles can be preferably used as window materials for various buildings and vehicles, which are used to shield infrared light while sufficiently taking in visible light and suppress a rise in indoor temperature while maintaining brightness, and filters used for a PDP (Plasma Display Panel) to shield infrared rays emitted forward from the PDP, for example.

Furthermore, the surface-treated infrared-absorbing fine particles according to the present invention have absorption properties in the infrared region, and accordingly, when a printed surface that contains the surface-treated infrared-absorbing fine particles is irradiated with an infrared laser, the surface-treated infrared-absorbing fine particles absorb infrared rays that have a specific wavelength. Therefore, if a forgery preventing print is obtained by printing one or both surfaces of a print medium with a forgery prevention ink that contains the surface-treated infrared-absorbing fine particles, and the print is irradiated with infrared rays having the specific wavelength, it is possible to determine whether the print is genuine or spurious based on a difference in the reflection amount or the transmission amount by detecting reflection or transmission. The forgery preventing print is an example of the infrared-absorbing fine particle dispersion according to the present invention.

It is also possible to produce an ink by mixing the infrared-absorbing fine particle dispersion liquid according to the present invention and a binder component, apply the ink to a substrate, dry the applied ink, and then curing the dried ink to form a photothermal conversion layer. The photothermal conversion layer can be caused to generate heat only at a desired position with high positional accuracy by being irradiated with an electromagnetic laser such as infrared rays, and is applicable to various fields such as electronics, medicine, agriculture, and mechanics. For example, the photothermal conversion layer can be preferably used for a donor sheet that is used to form an organic electroluminescence element using a laser transfer method, heat-sensitive paper for thermal printers, or an ink ribbon for thermal transfer printers. The photothermal conversion layer is an example of the infrared-absorbing fine particle dispersion according to the present invention.

Also, infrared absorbing fiber is obtained by dispersing the surface-treated infrared-absorbing fine particles according to the present invention in a suitable medium, and making the obtained dispersion contained in the surface and/or the inside of the fiber. Due to containing the surface-treated infrared-absorbing fine particles, the infrared absorbing fiber configured as described above efficiently absorbs near-infrared rays and the like from sunlight and exhibits an excellent heat retaining property, and at the same time, has an excellent design property because the fiber transmits visible light. Therefore, the infrared absorbing fiber can be used for various applications such as textile products including winter clothing for which the heat retaining property is required, sportswear, stockings, and curtains, and other industrial textile products. The infrared absorbing fiber is an example of the infrared-absorbing fine particle dispersion according to the present invention.

It is also possible to use the infrared-absorbing fine particle dispersion according to the present invention in the form of a film or a board as a material of roofs, exterior walls, and the like of agricultural and gardening houses. The material transmits visible light to take in light necessary for photosynthesis of plants in the agricultural and gardening houses, and efficiently absorbs light such as near-infrared light included in sunlight other than the visible light, and therefore, the material can be used as a heat insulation material for agricultural and gardening facility. The heat insulation material for agricultural and gardening facility is an example of the infrared-absorbing fine particle dispersion according to the present invention.

EXAMPLES

The present invention will be specifically described hereafter, with reference to examples. However, the present invention is not limited to the following examples.

The dispersed particle size of fine particles in a dispersion liquid of each of Examples and Comparative Examples is an average value that was measured using a particle size measuring device (ELS-8000 manufactured by Otsuka Electronics Co., Ltd.) based on the dynamic light scattering method. Further, the crystallite size was measured according to the powder X-ray diffraction method (0-20 method) using a powder X-ray diffractometer (X'Pert-PRO/MPD manufactured by Spectris Co., Ltd., PANalytical) and was calculated using the Rietveld method.

Optical properties of infrared absorbing sheets and infrared absorbing substrates were measured using a spectrophotometer (U-4100 manufactured by Hitachi, Ltd.), and visible light transmittance and solar transmittance were calculated according to JIS R3106.

Haze values of the infrared absorbing sheets and the infrared absorbing substrates were measured using a haze meter (HM-150 manufactured by Murakami Color Research Laboratory) and was calculated according to JIS K7105. When the haze value was no greater than 1.5%, it was determined that the haze value was low and the visibility was good, and when the haze value was greater than 1.5%, it was determined that the haze value was high and the visibility was poor.

The moist heat resistance of each infrared absorbing sheet was evaluated by exposing the infrared absorbing sheet having a visible light transmittance of around 80% to a moist heat atmosphere with a temperature of 85° C. and a relative humidity of 90% for 9 days. In the case of hexagonal cesium tungsten bronze, for example, when a change in the solar transmittance between before and after the exposure was no greater than 2.0%, it was determined that the moist heat resistance was good, and when the change was greater than 2.0%, it was determined that the moist heat resistance was insufficient.

The heat resistance of each infrared absorbing sheet was evaluated by exposing the infrared absorbing sheet having a visible light transmittance of around 80% to an air atmosphere with a temperature of 120° C. for 30 days. In the case of hexagonal cesium tungsten bronze, for example, when a change in the solar transmittance between before and after the exposure was no greater than 6.0%, it was determined that the heat resistance was good, and when the change was greater than 6.0%, it was determined that the heat resistance was insufficient.

The moist heat resistance of each infrared-absorbing substrate was evaluated by exposing the infrared-absorbing substrate having a visible light transmittance of around 80% to a moist heat atmosphere with a temperature of 85° C. and a relative humidity of 90% for 9 days. In the case of hexagonal cesium tungsten bronze, for example, when a change in the solar transmittance between before and after the exposure was no greater than 4.0%, it was determined that the moist heat resistance was good, and when the change was greater than 4.0%, it was determined that the moist heat resistance was insufficient.

The heat resistance of each infrared-absorbing substrate was evaluated by exposing the infrared-absorbing substrate having a visible light transmittance of around 80% to an air atmosphere with a temperature of 120° C. for 30 days. In the case of hexagonal cesium tungsten bronze, for example, when a change in the solar transmittance between before and after the exposure was no greater than 2.0%, it was determined that the heat resistance was good, and when the change was greater than 2.0%, it was determined that the heat resistance was insufficient.

Note that the optical property values (the visible light transmittance and the haze value) of the infrared absorbing sheets referred to herein are values that include optical property values of resin sheets that were base materials.

Example 1

25 mass % of hexagonal cesium tungsten bronze ($Cs_{0.33}WO_z$, $2.0 \leq z \leq 3.0$) powder CWO (registered trademark) (YM-01 manufactured by Sumitomo Metal Mining Co., Ltd.) with Cs/W (molar ratio)=0.33 and 75 mass % of pure water were mixed to obtain a liquid mixture, and the liquid mixture was put into a paint shaker containing 0.3 mmφ $ZrO_2$ beads, and pulverized and dispersed for 4 hours to obtain a $Cs_{0.33}WO_z$ fine particle dispersion liquid according to Example 1. The dispersed particle size of $Cs_{0.33}WO_z$ fine particles in the obtained dispersion liquid was measured and found to be 140 nm. Note that in the measurement of the particle size, the particle refractive index was set to 1.81, and the particle shape was set to non-spherical. Further, in the measurement, pure water was used as the background, and the solvent refractive index was set to 1.33. After the solvent of the obtained dispersion liquid was removed, the crystallite size was measured and found to be 50 nm. The obtained $Cs_{0.33}WO_z$ fine particle dispersion liquid was mixed with pure water to obtain a coating layer forming dispersion liquid A according to Example 1 in which the concentration of $Cs_{0.33}WO_z$ fine particles was 2 mass %.

On the other hand, 2.5 mass % of aluminum ethyl acetoacetate diisopropylate, which was used as an aluminum-based chelate compound, and 97.5 mass % of isopropyl alcohol (IPA) were mixed to obtain a surface treatment agent diluent a.

890 g of the obtained coating layer forming dispersion liquid A was put into a beaker, and 720 g of the surface treatment agent diluent a was added thereto dropwise over 6 hours while the dispersion liquid was strongly stirred with a stirrer having blades. After the dropwise addition of the surface treatment agent diluent a, stirring was further performed at a temperature of 20° C. for 24 hours to prepare an aged liquid according to Example 1. Subsequently, the medium was evaporated from the aged liquid using vacuum fluidized drying to obtain a powder containing surface-treated infrared-absorbing fine particles (surface-treated infrared-absorbing fine particle powder) according to Example 1.

8 mass % of the surface-treated infrared-absorbing fine particle powder according to Example 1, 24 mass % of a polyacrylate-based dispersant, and 68 mass % of toluene were mixed. The obtained liquid mixture was put into a paint shaker containing 0.3 mmφ $ZrO_2$ beads, and pulverized and dispersed for 1 hour to obtain an infrared-absorbing fine particle dispersion liquid according to Example 1. Subsequently, the medium was evaporated from the infrared-absorbing fine particle dispersion liquid using vacuum fluidized drying to obtain an infrared-absorbing fine particle dispersion powder according to Example 1.

Dry blending of the infrared-absorbing fine particle dispersion powder according to Example 1 and polycarbonate resin was performed such that an infrared absorbing sheet to be obtained had a visible light transmittance of around 80% (in this example, the blending was performed such that the concentration of surface-treated infrared-absorbing fine particles was 0.06 mass %). The obtained blend was kneaded at 290° C. using a twin screw extruder and extruded from a T-die into a sheet material having a thickness of 0.75 mm using a calendar roll method to obtain an infrared absorbing sheet according to Example 1. The infrared absorbing sheet is an example of the infrared-absorbing fine particle dispersion according to the present invention.

Optical properties of the obtained infrared absorbing sheet according to Example 1 were measured, and it was found that the visible light transmittance was 79.7%, the solar transmittance was 48.9%, and the haze value was 1.4%.

After the obtained infrared absorbing sheet according to Example 1 was exposed to a moist heat atmosphere with a temperature of 85° C. and a relative humidity of 90% for 9 days, optical properties were measured, and it was found that the visible light transmittance was 80.3%, the solar transmittances was 49.8%, and the haze value was 1.4%. It was found that when the infrared absorbing sheet was exposed to the moist heat atmosphere, the change amount in the visible light transmittance was 0.6% and the change amount in the solar transmittance was 0.9%, both of the values being small, and the haze value did not change.

Also, after the obtained infrared absorbing sheet according to Example 1 was exposed to an air atmosphere with a temperature of 120° C. for 30 days, optical properties were measured, and it was found that the visible light transmittance was 81.8%, the solar transmittance was 54.0%, and the haze value was 1.4%. It was found that when the infrared absorbing sheet was exposed to the moist heat atmosphere, the change amount in the visible light transmittance was 2.1% and the change amount in the solar transmittance was 5.1%, both of the values being small, and the haze value did not change.

The production conditions are shown in Table 1 and the evaluation results are shown in Table 3.

Examples 2 and 3

25 mass % of hexagonal cesium tungsten bronze $(Cs_{0.33}WO_z)$ powder (YM-01 manufactured by Sumitomo Metal Mining Co., Ltd.) with Cs/W (molar ratio)=0.33 and 75 mass % of pure water were mixed to obtain a liquid mixture, and the liquid mixture was put into a paint shaker containing 0.3 mmφ $ZrO_2$ beads, and pulverized and dispersed for 6 hours (Example 2) or 3 hours (Example 3) to obtain $Cs_{0.33}WO_z$ fine particle dispersion liquids according to Examples 2 and 3.

Dispersed particle sizes of $Cs_{0.33}WO_z$ fine particles in the dispersion liquids of Examples 2 and 3 were measured and found to be 120 nm and 160 nm, respectively. Note that in the measurement of the particle size, the particle refractive index was set to 1.81, and the particle shape was set to non-spherical. Further, in the measurement, pure water was used as the background, and the solvent refractive index was set to 1.33.

After the solvent of the obtained dispersion liquids was removed, crystallite sizes of $Cs_{0.33}WO_z$ fine particles according to Examples 2 and 3 were measured and found to be 42 nm and 60 nm, respectively.

The obtained $Cs_{0.33}WO_z$ fine particle dispersion liquids according to Examples 2 and 3 were each mixed with pure water to obtain a coating layer forming dispersion liquid B according to Example 2 and a coating layer forming dispersion liquid C according to Example 3 in which the concentration of $Cs_{0.33}WO_z$ fine particles was 2 mass %.

Surface-treated infrared-absorbing fine particle powders, infrared-absorbing fine particle dispersion liquids, infrared-absorbing fine particle dispersion powders, and infrared absorbing sheets according to Examples 2 and 3 were obtained through the same procedure as in Example 1 in all aspects other than that the coating layer forming dispersion liquids B and C were used instead of the coating layer forming dispersion liquid A, and evaluation was performed in the same manner as in Example 1. The production conditions are shown in Table 1 and evaluation results are shown in Table 3.

Comparative Example 1

7 mass % of hexagonal cesium tungsten bronze powder, 24 mass % of a polyacrylate-based dispersant, and 69 mass % of toluene were mixed to obtain a liquid mixture, and the liquid mixture was put into a paint shaker containing 0.3 mmφ $ZrO_2$ beads, and pulverized and dispersed for 4 hours to obtain a coating layer forming dispersion liquid D according to Comparative Example 1. The dispersed particle size of infrared-absorbing fine particles in the obtained coating layer forming dispersion liquid D was measured and found to be 100 nm. Note that in the measurement of the particle size, the particle refractive index was set to 1.81, and the particle shape was set to non-spherical. Further, in the measurement, toluene was used as the background, and the solvent refractive index was set to 1.50. After the solvent of the obtained dispersion liquid was removed, the crystallite size was measured and found to be 32 nm.

The coating layer forming dispersion liquid D was used as is as an infrared-absorbing fine particle dispersion liquid according to Comparative Example 1, without a surface treatment agent being added thereto. The medium was evaporated from the infrared-absorbing fine particle dispersion liquid according to Comparative Example 1 using vacuum fluidized drying to obtain an infrared-absorbing fine particle dispersion powder according to Comparative Example 1.

Dry blending of the infrared-absorbing fine particle dispersion powder according to Comparative Example 1 and polycarbonate resin was performed such that the concentration of the infrared-absorbing fine particles was 0.075 mass %. The obtained blend was kneaded at 290° C. using a twin screw extruder and extruded from a T-die into a sheet material having a thickness of 0.75 mm using the calendar roll method to obtain an infrared absorbing sheet according to Comparative Example 1.

Optical properties of the obtained infrared absorbing sheet according to Comparative Example 1 were measured, and it was found that the visible light transmittance was 79.2%, the solar transmittance was 48.4%, and the haze value was 1.0%.

After the obtained infrared absorbing sheet according to Comparative Example 1 was exposed to a moist heat atmosphere with a temperature of 85° C. and a relative humidity of 90% for 9 days, optical properties were measured, and it was found that the visible light transmittance was 81.2%, the solar transmittances was 52.6%, and the haze value was 1.2%. It was found that when the infrared absorbing sheet was exposed to the moist heat atmosphere, the change amount in the visible light transmittance was 2.0% and the change amount in the solar transmittance was 4.2%, the values being large when compared with those in the Examples. The change amount in the haze value was 0.2%.

Also, after the obtained infrared absorbing sheet according to Comparative Example 1 was exposed to an air atmosphere with a temperature of 120° C. for 30 days, optical properties were measured, and it was found that the visible light transmittance was 83.3%, the solar transmittance was 59.8%, and the haze value was 1.6%. It was found that when the infrared absorbing sheet was exposed to the moist heat atmosphere, the change amount in the visible light transmittance was 4.1% and the change amount in the solar transmittance was 11.4%, the values being large when compared with those in the Examples. The change amount in the haze value was 0.6%.

The production conditions are shown in Table 2 and the evaluation results are shown in Table 4.

Comparative Example 2

The coating layer forming dispersion liquid A according to Example 1 was used as is as an infrared-absorbing fine particle dispersion liquid according to Comparative Example 2, without a surface treatment agent being added thereto. The medium was evaporated from the infrared-absorbing fine particle dispersion liquid according to Comparative Example 2 using vacuum fluidized drying to obtain an infrared-absorbing fine particle dispersion powder according to Comparative Example 2.

The infrared-absorbing fine particle dispersion liquid, the infrared-absorbing fine particle dispersion powder, and an infrared absorbing sheet according to Comparative Example 2 were obtained through the same procedure as in Comparative Example 1 in all aspects other than that the surface-treated infrared-absorbing fine particle powder according to Comparative Example 2 was used instead of the surface-treated infrared-absorbing fine particle powder according to Comparative Example 1, and evaluation was performed in the same manner as in Example 1. The production conditions are shown in Table 2 and evaluation results are shown in Table 4.

Comparative Example 3

25 mass % of hexagonal cesium tungsten bronze (Cs$_{0.33}$WO$_z$) powder (YM-01 manufactured by Sumitomo Metal Mining Co., Ltd.) with Cs/W (molar ratio)=0.33 and 75 mass % of pure water were mixed to obtain a liquid mixture, and the liquid mixture was put into a paint shaker containing 0.3 mmφ ZrO$_2$ beads, and pulverized and dispersed for 10 hours to obtain a Cs$_{0.33}$WO$_z$ fine particle dispersion liquid according to Comparative Example 3.

The dispersed particle size of Cs$_{0.33}$WO$_z$ fine particles in the obtained dispersion liquid according to Comparative Example 3 was measured and found to be 100 nm. Note that in the measurement of the particle size, the particle refractive index was set to 1.81, and the particle shape was set to non-spherical. Further, in the measurement, pure water was used as the background, and the solvent refractive index was set to 1.33.

After the solvent of the obtained dispersion liquid was removed, the crystallite size of Cs$_{0.33}$WO$_z$ fine particles according to Comparative Example 3 was measured and found to be 32 nm.

The obtained Cs$_{0.33}$WO$_z$ fine particle dispersion liquid according to Comparative Example 3 was mixed with pure water to obtain a coating layer forming dispersion liquid E according to Comparative Example 3 in which the concentration of Cs$_{0.33}$WO$_z$ fine particles was 2 mass %.

A surface-treated infrared-absorbing fine particle powder, an infrared-absorbing fine particle dispersion liquid, an infrared-absorbing fine particle dispersion powder, and an infrared absorbing sheet according to Comparative Example 3 were obtained through the same procedure as in Example 1 in all aspects other than that the coating layer forming dispersion liquid E was used instead of the coating layer forming dispersion liquid A, and evaluation was performed in the same manner as in Example 1. The production conditions are shown in Table 2 and evaluation results are shown in Table 4.

Examples 4

10 g of the surface-treated infrared-absorbing fine particle powder according to Example 1 was mixed with 23 g of isopropyl alcohol, 16 g of tetraethoxysilane, and 10 g of 3-glycidoxypropyltrimethoxysilane to obtain a liquid mixture. The obtained liquid mixture was put into a paint shaker containing 0.3 mmφ ZrO$_2$ beads, and pulverized and dispersed for 1 hour. Thereafter, 40 g of 0.1 mol/liter nitric acid was added, and the mixture was stirred at 20° C. for 1 hour to obtain an infrared-absorbing fine particle dispersion liquid according to Example 4.

Note that tetramethoxysilane and 3-glycidoxypropyltrimethoxysilane are glass coating agents that are silane-based alkoxides.

The infrared-absorbing fine particle dispersion liquid according to Example 4 was applied to a glass substrate having a thickness of 3 mm by using a bar coater (IMC-700 manufactured by Imoto machinery Co., LTD.) to form a coating film. The coating film was heated at 150° C. for 30 minutes to form a coating layer and obtain an infrared-absorbing substrate according to Example 4. The thickness of the coating layer was measured and found to be 3 μm.

Optical properties of the obtained infrared-absorbing substrate according to Example 4 were measured, and it was found that the visible light transmittance was 79.5%, the solar transmittance was 46.7%, and the haze value was 0.7%.

After the obtained infrared-absorbing substrate according to Example 4 was exposed to a moist heat atmosphere with a temperature of 85° C. and a relative humidity of 90% for 9 days, optical properties were measured, and it was found that the visible light transmittance was 81.6%, the solar transmittances was 50.0%, and the haze value was 0.7%. It was found that when the infrared-absorbing substrate was exposed to the moist heat atmosphere, the change amount in the visible light transmittance was 2.1% and the change amount in the solar transmittance was 3.3%, both of the values being small, and the haze value did not change.

Also, after the obtained infrared absorbing substrate according to Example 4 was exposed to an air atmosphere with a temperature of 120° C. for 30 days, optical properties were measured, and it was found that the visible light transmittance was 80.7%, the solar transmittance was 48.3%, and the haze value was 0.7%. It was found that when the infrared-absorbing substrate was exposed to the moist heat atmosphere, the change amount in the visible light transmittance was 1.2% and the change amount in the solar transmittance was 1.6%, both of the values being small, and the haze value did not change.

The production conditions are shown in Table 5 and the evaluation results are shown in Table 6.

Comparative Example 4

An infrared-absorbing fine particle dispersion liquid and an infrared-absorbing substrate according to Comparative Example 4 were obtained through the same procedure as in Example 4 in all aspects other than that the surface-treated infrared-absorbing fine particle powder according to Comparative Example 3 was used instead of the surface-treated infrared-absorbing fine particle powder according to Example 4, and evaluation was performed in the same manner as in Example 4. The production conditions are shown in Table 5 and evaluation results are shown in Table 6.

Comparative Example 5

An infrared-absorbing fine particle dispersion liquid and an infrared-absorbing substrate according to Comparative Example 5 were obtained through the same procedure as in Comparative Example 4 in all aspects other than that the infrared-absorbing fine particle powder according to Comparative Example 2 was used instead of the surface-treated infrared-absorbing fine particle powder according to Comparative Example 4, and evaluation was performed in the same manner as in Example 4. The production conditions are shown in Table 5 and evaluation results are shown in Table 6.

Based on the results described above, it was confirmed that the infrared absorbing sheets according to Examples 1 to 3 and the infrared-absorbing substrate according to Example 4 had low haze values, and accordingly had excellent visibility, and were also excellent in the moist heat resistance and the heat resistance.

On the other hand, it was confirmed that the infrared absorbing sheets according to Comparative Examples 1 to 3 and the infrared-absorbing substrates according to Comparative Examples 4 and 5 were not satisfactory in at least one of the visibility, the moist heat resistance, and the heat resistance, and did not satisfy market demands.

TABLE 1

| | Coating layer forming dispersion liquid | | | | | Surface treatment agent diluent | | | | | |
| | Infrared- | Pulverization | | | | Surface treatment agent | | IPA | | | |
| | absorbing fine particles | dispersion treatment [hour] | Addition amount [mass %] | Dispersion medium | | Type | Addition amount [mass %] | Addition amount [mass %] | Dripping amount [g] | Dripping time [h] | Matrix resin |
|---|---|---|---|---|---|---|---|---|---|---|---|
| Example 1 | Hexagonal | A | 4 | 2 | Water | a | Aluminum | 2.5 | 97.5 | 720 | 6 | Polycar- |
| Example 2 | cesium | B | 6 | 2 | | a | ethyl | 2.5 | 97.5 | 720 | 6 | bonate |
| Example 3 | tungsten bronze | C | 8 | 2 | | a | acetoacetate diisopropylate | 2.5 | 97.5 | 720 | 6 | |

TABLE 2

| | Coating layer forming dispersion liquid | | | | | Surface treatment agent diluent | | | | | |
| | Infrared- | Pulverization | | | | Surface treatment agent | | IPA | | | |
| | absorbing fine particles | dispersion treatment [hour] | Addition amount [mass %] | Dispersion medium | | Type | Addition amount [mass %] | Addition amount [mass %] | Dripping amount [g] | Dripping time [h] | Matrix resin |
|---|---|---|---|---|---|---|---|---|---|---|---|
| Comparative Example 1 | Hexagonal cesium | D | 4 | 7 | Toluene | — | — | — | — | — | — | Polycar- bonate |
| Comparative Example 2 | tungsten bronze | A | 4 | 2 | Water | — | — | — | — | — | — | |
| Comparative Example 3 | | E | 10 | 2 | | a | Aluminum ethyl acetoaetate diisoproylate | 2.5 | 97.5 | 720 | 6 | |

TABLE 3

| | Surface-treated | Infrared absorbing sheet | | | | | | | | | |
| | infrared-absorbing fine particles | Initial | | | Change amount after 9 days in moist heat atmosphere | | | Change amount after 30 days in air bath at 120° C. | | |
| | Crystallite size in dispersion liquid [nm] | Visible light transmittance [%] | Solar transmittance [%] | Haze [%] | Visible light transmittance [%] | Solar transmittance [%] | Haze [%] | Visible light transmittance [%] | Solar transmittance [%] | Haze [%] |
|---|---|---|---|---|---|---|---|---|---|---|
| Example 1 | 50 | 79.7 | 48.9 | 1.4 | 0.6 | 0.9 | 0.0 | 2.1 | 5.1 | 0.0 |
| Example 2 | 42 | 79.8 | 48.5 | 1.2 | 0.6 | 1.0 | 0.0 | 2.4 | 5.9 | 0.0 |
| Example 3 | 60 | 80.2 | 49.1 | 1.5 | 0.5 | 0.9 | 0.0 | 1.9 | 4.6 | 0.0 |

TABLE 4

| Surface-treated infrared-absorbing fine particles | Infrared absorbing sheet | | | | | | | | |
| --- | --- | --- | --- | --- | --- | --- | --- | --- | --- |
| | Initial | | | Change amount after 9 days in moist heat atmosphere | | | Change amount after 30 days in air bath at 120° C. | | |
| Crystallite size in dispersion liquid [nm] | Visible light transmittance [%] | Solar transmittance [%] | Haze [%] | Visible light transmittance [%] | Solar transmittance [%] | Haze [%] | Visable light transmittance [%] | Solar transmittance [%] | Haze [%] |
| Comparative Example 1 — 32 | 79.2 | 48.4 | 1.0 | 2.0 | 4.2 | 0.2 | 4.1 | 11.4 | 0.6 |
| Comparative Example 2 — 50 | 79.5 | 49.0 | 2.1 | 1.9 | 4.0 | 0.2 | 2.2 | 5.3 | 0.0 |
| Comparative Example 3 — 32 | 79.7 | 48.7 | 1.0 | 0.6 | 0.9 | 0.0 | 4.8 | 12.1 | 0.7 |

TABLE 5

| | Coating layer forming dispersion liquid | | | | Surface treatment agent diluent | | | | |
| --- | --- | --- | --- | --- | --- | --- | --- | --- | --- |
| | Infrared-absorbing fine particles | Pulverization | | | Surface treatment agent | | IPA | | |
| | | dispersion treatment [hour] | Addition amount [mass %] | Dispersion medium | Type | Addition amount [mass %] | Addition amount [mass %] | Dripping amount [g] | Dripping time [h] |
| Example 4 | Hexagonal cesium tungsten bronze | A | 4 | 2 | Water a | Aluminum ethyl acetoacetate diisopropylate | 2.5 | 97.5 | 720 | 6 |
| Comparative Example 4 | | E | 10 | 2 | | | 2.5 | 97.5 | 720 | 6 |
| Comparative Example 5 | | A | 4 | 2 | — | — | — | — | — | — |

TABLE 6

| Surface-treated infrared-absorbing fine particles | Infrared absorbing substrate | | | | | | | | |
| --- | --- | --- | --- | --- | --- | --- | --- | --- | --- |
| | Initial | | | Change amount after 9 days in moist heat atmosphere | | | Change amount after 30 days in air bath at 120° C. | | |
| Crystallite size in dispersion liquid [nm] | Visible light transmittance [%] | Solar transmittance [%] | Haze [%] | Visible light transmittance [%] | Solar transmittance [%] | Haze [%] | Visible light transmittance [%] | Solar transmittance [%] | Haze [%] |
| Example 4 — 50 | 79.5 | 46.7 | 0.7 | 2.1 | 3.3 | 0.0 | 1.2 | 1.6 | 0.0 |
| Comparative Example 4 — 32 | 79.6 | 46.5 | 0.5 | 2.2 | 3.4 | 0.0 | 2.2 | 3.7 | 0.3 |
| Comparative Example 5 — 50 | 79.4 | 46.3 | 0.7 | 4.4 | 7.2 | 0.4 | 1.3 | 1.8 | 0.0 |

The invention claimed is:

1. Surface-treated infrared-absorbing fine particles each comprising:

an infrared-absorbing fine particle having a crystallite size of 42 nm or more and 60 nm or less; and a coating layer coated on a surface of the infrared-absorbing fine particle, the coating layer containing:

a hydrolysis product of a metal chelate compound, or a hydrolysis product of a metal cyclic oligomer compound, wherein the metal chelate compound or the metal cyclic oligomer compound contains Al, the metal chelate compound or the metal cyclic oligomer compound has at least one selected from the group consisting of an ether bond, an ester bond, and an acetyl group, and the infrared-absorbing fine particles are represented by a formula $M_xW_yO_z$, where M is at least one element selected from the group consisting of Cs, K, Rb, Tl, In, Ba, Li, Ca, Sr, Fe, and Sn, W is tungsten, O is oxygen, satisfying $0.2 \leq x/y \leq 0.5$ and $2.0 \leq z/y \leq 3.0$.

2. A surface-treated infrared-absorbing fine particle powder containing the surface-treated infrared-absorbing fine particles according to claim 1.

3. The surface-treated infrared-absorbing fine particles according to claim 1, wherein the metal chelate compound and the metal cyclic oligomer compound are metal acetylacetonate or metal carboxylate.

4. The surface-treated infrared-absorbing fine particles according to claim 1, wherein the metal chelate compound and the metal cyclic oligomer compound are not metal alkoxide.

5. The surface-treated infrared-absorbing fine particle powder according to claim 2, wherein a carbon concentration in the surface-treated infrared-absorbing fine particle powder is 0.2 mass % or more and 5.0 mass % or less, the carbon concentration being based on an amount of residual carbon present in the coating layer.

6. The surface-treated infrared-absorbing fine particles according to claim 1, wherein the coating layer further contains a polymer of the hydrolysis product of the metal chelate compound or a polymer of the hydrolysis product of the metal cyclic oligomer compound.

7. The surface-treated infrared-absorbing fine particles according to claim 1, wherein the coating layer is not subjected to heat treatment to increase density or chemical stability thereof.

8. An infrared-absorbing fine particle dispersion liquid in which the surface-treated infrared-absorbing fine particles according to claim 1 are dispersed in a predetermined liquid medium.

9. The infrared-absorbing fine particle dispersion liquid according to claim 8, wherein the liquid medium is at least one liquid medium selected from the group consisting of an organic solvent, fat, oil, a liquid plasticizer, a compound polymerized by curing, and water.

10. An infrared-absorbing fine particle dispersion that is a dry solidified product of the infrared-absorbing fine particle dispersion liquid according to claim 8.

11. An infrared-absorbing fine particle dispersion in which the surface-treated infrared-absorbing fine particles according to claim 1 are dispersed in a predetermined solid-state resin.

12. The infrared-absorbing fine particle dispersion according to claim 11, wherein the solid-state resin is at least one resin selected from the group consisting of fluorocarbon resin, PET resin, acrylic resin, polyamide resin, vinyl chloride resin, polycarbonate resin, olefin resin, epoxy resin, and polyimide resin.

13. An infrared-absorbing substrate comprising a coating layer that is formed on at least one surface of at least one substrate, wherein the coating layer contains the surface-treated infrared-absorbing fine particles according to claim 1.

14. The infrared-absorbing substrate according to claim 13, wherein the coating layer further contains a glass coating agent.

15. The infrared-absorbing substrate according to claim 14, wherein the glass coating agent is at least one selected from the group consisting of a silane coupling agent, a silane-based alkoxide, a polysilazane, and a polyorganosilane.

16. The infrared-absorbing substrate according to claim 13, wherein the substrate is at least one selected from the group consisting of a glass substrate and a resin substrate.

* * * * *